US011803911B2

(12) United States Patent
Bixby et al.

(10) Patent No.: US 11,803,911 B2
(45) Date of Patent: *Oct. 31, 2023

(54) SYSTEMS AND METHODS FOR ITERATIVE OPTIMIZATION OF RELATED OBJECTS

(71) Applicant: Chicago Mercantile Exchange Inc., Chicago, IL (US)

(72) Inventors: David Bixby, Arlington Heights, IL (US); Frederick Sturm, Chicago, IL (US); Edmund Carey, Chicago, IL (US); Sten Anderson, Glenview, IL (US); Vivek Kondaveeti, Chicago, IL (US); Thomas Lord, Chicago, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 105 days.

This patent is subject to a terminal disclaimer.

(21) Appl. No.: 17/525,299

(22) Filed: Nov. 12, 2021

(65) Prior Publication Data

US 2022/0076338 A1 Mar. 10, 2022

Related U.S. Application Data

(63) Continuation of application No. 16/535,617, filed on Aug. 8, 2019, now Pat. No. 11,205,224, which is a
(Continued)

(51) Int. Cl.
*G06Q 40/04* (2012.01)
(52) U.S. Cl.
CPC .................. *G06Q 40/04* (2013.01)

(58) Field of Classification Search
CPC .................................................. G06Q 40/04
(Continued)

(56) References Cited

U.S. PATENT DOCUMENTS 7,346,571 B1 3/2008 Fujita
7,509,275 B2 3/2009 Glinberg et al.
(Continued)

OTHER PUBLICATIONS

Nordone et al., "Hedging your bets on credit risk", Corporate Finance 201: 36-37, Euromoney Institutional Investor PLC, August (Year: 2001).*
(Continued)

*Primary Examiner* — Frantzy Poinvil
(74) *Attorney, Agent, or Firm* — LEMPIA SUMMERFIELD KATZ LLC

(57) ABSTRACT

A computer implemented method for assigning values to objects includes receiving a plurality of values for each of a plurality of base objects including a first and second base object; receiving a plurality of values for a first composite object associated with the first and second base objects; generating and storing in the memory a solution set including combinations of values of the first and second base objects; for each combination in the solution set, generating first transaction results by computing transactions between the values of the first and second base objects; comparing each of the first transaction results to a first range of values including the values of the first composite object; and removing, from the solution set and from the memory, the combinations of the values of the first and second base objects corresponding to the first transaction results that are outside of the first range of values.

20 Claims, 41 Drawing Sheets

Related U.S. Application Data continuation of application No. 15/000,793, filed on Jan. 19, 2016, now Pat. No. 10,430,881.

(58) Field of Classification Search
USPC .................................................. 705/3–44
See application file for complete search history.

(56) References Cited

U.S. PATENT DOCUMENTS

| | | | |
|---|---|---|---|
| 7,593,877 B2 | 9/2009 | Glinberg et al. | |
| 7,676,424 B2 | 3/2010 | Stevens et al. | |
| 7,813,995 B2 | 10/2010 | Burns | |
| 7,873,564 B1 * | 1/2011 | Stevens | G06Q 40/00 |
| | | | 705/37 |
| 7,899,734 B2 | 3/2011 | Ausubel | |
| 7,991,686 B1 * | 8/2011 | Stevens | G06Q 40/04 |
| | | | 705/37 |
| 8,180,692 B2 | 5/2012 | Kemp, II | |
| 8,560,415 B2 | 10/2013 | Konduru | |
| 8,762,222 B2 | 6/2014 | Ausubel | |
| 8,799,081 B1 | 8/2014 | Koran | |
| 9,972,049 B2 | 5/2018 | Kemp, II et al. | |
| 2003/0028475 A1 | 2/2003 | Boutilier | |
| 2004/0006529 A1 | 1/2004 | Fung | |
| 2004/0054617 A1 | 3/2004 | Fung | |
| 2006/0259409 A1 | 11/2006 | Burns et al. | |
| 2007/0162365 A1 * | 7/2007 | Weinreb | G06Q 40/00 |
| | | | 705/35 |
| 2009/0037345 A1 * | 2/2009 | Barker | G06Q 40/06 |
| | | | 705/37 |
| 2009/0132408 A1 | 5/2009 | Stevens | |
| 2010/0121760 A1 | 5/2010 | Stevens et al. | |
| 2011/0313905 A1 | 12/2011 | Siddall et al. | |
| 2012/0072326 A1 * | 3/2012 | Acuna-Rohter | G06Q 40/04 |
| | | | 705/37 |
| 2012/0123967 A1 | 5/2012 | Glinberg et al. | |
| 2012/0130923 A1 | 5/2012 | Shah | |
| 2013/0018768 A1 | 1/2013 | Sturm et al. | |
| 2013/0054439 A1 | 2/2013 | Zhao et al. | |
| 2013/0132250 A1 | 5/2013 | Fraser et al. | |
| 2014/0081826 A1 | 3/2014 | Acuna-rohter et al. | |
| 2014/0143021 A1 | 5/2014 | Niles | |
| 2014/0222587 A1 | 8/2014 | Feldman | |
| 2014/0304142 A1 | 10/2014 | Ausubel | |
| 2015/0073962 A1 | 3/2015 | Bixby et al. | |
| 2015/0154701 A1 * | 6/2015 | Jaberg | G06Q 40/04 |
| | | | 705/37 |
| 2015/0294409 A1 | 10/2015 | Madhavan | |
| 2015/0310550 A1 * | 10/2015 | Minami | G06Q 40/04 |
| | | | 705/37 |
| 2017/0371879 A1 * | 12/2017 | Jang | G06Q 40/04 |
| 2018/0255762 A1 | 9/2018 | Rubel | |
| 2019/0236700 A1 * | 8/2019 | Shterk | G06Q 40/06 |
| 2019/0392525 A1 | 12/2019 | Kemp, II | |

OTHER PUBLICATIONS

CME, "CBOT Corn, Wheat, Rice, Oats, Soybean, Soybean Meal, Soybean Oil and KCBT Wheat Futures Daily Settlement Procedure", Jul. 29, 2013.

Rothkopf et al., Computationally manageable combinational actions, Management Science 44.8: 1131-1147. Institute for Operations Research and the Management Sciences, ProQuest Document Id: 01697836, August (Year: 1998).

* cited by examiner

| Contract1 Outright Market | C1Bid | C1Offer |

| Contract1 Possible Values | C1Bid | C1Tick1 | C1Offer |

Fig. 17A

| Contract2 Outright Market | C2Bid | C2Offer |
|---|---|---|

| Contract2 Possible Values | C2Bid | C2Offer |
|---|---|---|

Fig. 17B

| Matrix 1 | |
|---|---|
| | Contract1, Contract2 Possible Values |
| Possible Solution 1 | C1Bid, C2Bid |
| Possible Solution 2 | C1Bid, C2Offer |
| Possible Solution 3 | C1Tick1, C2Bid |
| Possible Solution 4 | C1Tick1, C2Offer |
| Possible Solution 5 | C1Offer, C2Bid |
| Possible Solution 6 | C1Offer, C2Offer |

Fig. 18A

| Matrix 1 | | |
|---|---|---|
| | Contract1, Contract2 Possible Values | Implied Spread Value between Contract1 and Contract2 |
| Possible Solution 1 | C1Bid, C2Bid | C1Bid-C2Bid |
| Possible Solution 2 | C1Bid, C2Offer | C1Bid-C2Offer |
| Possible Solution 3 | C1Tick1, C2Bid | C1Tick1-C2Bid |
| Possible Solution 4 | C1Tick1, C2Offer | C1Tick1-C2Offer |
| Possible Solution 5 | C1Offer, C2Bid | C1Offer-C2Bid |
| Possible Solution 6 | C1Offer, C2Offer | C1Offer-C2Offer |

Fig. 18B

| CalendarSpread1-2 Tradable Market | CS1-2Bid | CS1-2Offer |

| CalendarSpread1-2 Possible Values | CS1-2Bid | CS1-2Offer |

| Matrix 1 | | | |
| --- | --- | --- | --- |
|  | Contract1, Contract2 Possible Values | Implied Spread Value between Contract1 and Contract2 | First Filter: Is the Implied Spread Value between Contract1 and Contract2 Valid for the Tradable Instrument CalendarSpread1-2's Possible Values? |
| Possible Solution 1 | C1Bid, C2Bid | C1Bid-C2Bid | Yes |
| Possible Solution 2 | C1Bid, C2Offer | C1Bid-C2Offer | Yes |
| Possible Solution 3 | C1Tick1, C2Bid | C1Tick1-C2Bid | NO |
| Possible Solution 4 | C1Tick1, C2Offer | C1Tick1-C2Offer | Yes |
| Possible Solution 5 | C1Offer, C2Bid | C1Offer-C2Bid | NO |
| Possible Solution 6 | C1Offer, C2Offer | C1Offer-C2Offer | NO |

Fig. 19A

Matrix 2

| | Contract1, Contract2 Possible Values | Implied Spread Value between Contract1 and Contract2 | First Filter: Is the Implied Spread Value between Contract1 and Contract2 Valid for the Tradable Instrument CalendarSpread1-2's Possible Values? |
|---|---|---|---|
| Possible Solution 1 | C1Bid, C2Bid | C1Bid-C2Bid | Yes |
| Possible Solution 2 | C1Bid, C2Offer | C1Bid-C2Offer | Yes |
| ~~Possible Solution 3 Eliminated due to first filter~~ | ~~C1Tick1, C2Bid~~ | ~~C1Tick1-C2Bid~~ | ~~No~~ |
| Possible Solution 4 | C1Tick1, C2Offer | C1Tick1-C2Offer | Yes |
| ~~Possible Solution 5 Eliminated due to first filter~~ | ~~C1Offer, C2Bid~~ | ~~C1Offer-C2Bid~~ | ~~No~~ |
| ~~Possible Solution 6 Eliminated due to first filter~~ | ~~C1Offer, C2Offer~~ | ~~C1Offer-C2Offer~~ | ~~No~~ |

Fig. 19B

| Contract3 Outright Market | C3Bid | C3Offer |
|---|---|---|

| Contract3 Possible Values | C3Bid | C3Offer |
|---|---|---|

Matrix 3

| | Contract1, Contract2, Contract3 Possible Values | Implied Spread Value between Contract1 and Contract3 |
|---|---|---|
| Possible Solution 1 | C1Bid, C2Bid, C3Bid | C1Bid-C3Bid |
| Possible Solution 2 | C1Bid, C2Offer, C3Bid | C1Bid-C3Bid |
| ~~Possible Solution 3~~ Eliminated due to first filter | Not Calculated | Not Calculated |
| Possible Solution 4 | C1Tick1, C2Offer, C3Bid | C1Tick1-C3Bid |
| ~~Possible Solution 5~~ Eliminated due to first filter | Not Calculated | Not Calculated |
| ~~Possible Solution 6~~ Eliminated due to first filter | Not Calculated | Not Calculated |
| Potential Solution 7 | C1Bid, C2Bid, C3Offer | C1Bid-C3Offer |
| Potential Solution 8 | C1Bid, C2Offer, C3Offer | C1Bid-C3Offer |
| Potential Solution 9 | C1Tick1, C2Offer, C3Offer | C1Tick1 - C3Offer |

Fig. 20

| CalendarSpread1-3 Tradable Market | CS1-3Bid | CS1-3Offer |
|---|---|---|

| CalendarSpread1-3 Possible Values | CS1-3Bid | CS1-3Offer |
|---|---|---|

Matrix 3

| | Contract1, Contract2, Contract3 Possible Values | Implied Spread Value between Contract1 and Contract3 | Second Filter: Is the Implied Spread Value between Contract1 and Contract3 Valid for the Tradable Instrument CalendarSpread1-3's Possible Values? |
|---|---|---|---|
| Possible Solution 1 | C1Bid, C2Bid, C3Bid | C1Bid-C3Bid | Yes |
| Possible Solution 2 | C1Bid, C2Offer, C3Bid | C1Bid-C3Bid | Yes |
| ~~Possible Solution 3~~ Eliminated due to first filter | *Not Calculated* | *Not Calculated* | *Not Calculated* |
| Possible Solution 4 | C1Tick1, C2Offer, C3Bid | C1Tick1-C3Bid | NO |
| ~~Possible Solution 5~~ Eliminated due to first filter | *Not Calculated* | *Not Calculated* | *Not Calculated* |
| ~~Possible Solution 6~~ Eliminated due to first filter | *Not Calculated* | *Not Calculated* | *Not Calculated* |
| Potential Solution 7 | C1Bid, C2Bid, C3Offer | C1Bid-C3Offer | Yes |
| Potential Solution 8 | C1Bid, C2Offer, C3Offer | C1Bid-C3Offer | NO |
| Potential Solution 9 | C1Tick1, C2Offer, C3Offer | C1Tick1-C3Offer | Yes |

Fig. 21A

Matrix 4

| | Contract1, Contract2, Contract3 Possible Values | Implied Spread Value between Contract1 and Contract3 | Second Filter: Is the Implied Spread Value between Contract1 and Contract3 Valid for the Tradable Instrument CalendarSpread1-3's Possible Value? |
|---|---|---|---|
| Possible Solution 1 | C1Bid, C2Bid, C3Bid | C1Bid-C3Bid | Yes |
| Possible Solution 2 | C1Bid, C2Offer, C3Bid | C1Bid-C3Bid | Yes |
| ~~Possible Solution 3 Eliminated due to first filter~~ | ~~C1Tick1, C3Offer, C3Bid~~ | ~~C1Tick1- C3Bid~~ | ~~No~~ |
| ~~Possible Solution 4 Eliminated due to second filter~~ | Not Calculated | Not Calculated | Not Calculated |
| ~~Possible Solution 5 Eliminated due to first filter~~ | Not Calculated | Not Calculated | Not Calculated |
| Potential Solution 7 | C1Bid, C2Bid, C3Offer | C1Bid-C3Offer | Yes |
| ~~Potential Solution 8 Eliminated due to second filter~~ | ~~C1Bid, C2Offer, C3Offer~~ | ~~C1Bid- C3Offer~~ | ~~No~~ |
| Potential Solution 9 | C1Tick1, C2Offer, C3Offer | C1Tick1- C3Offer | Yes |

Fig. 21B

| | CalendarSpread2-3 Tradable Market | CS2-3Bid | CS2-3Offer |
|---|---|---|---|
| | CalendarSpread2-3 Possible Values | CS2-3Bid | CS2-3Offer |

Matrix 4

| | Contract1, Contract2, Contract3 Possible Values | Implied Spread Value between Contract2 and Contract3 | Third Filter: Is the Implied Spread Value between Contract2 and Contract3 Valid for the Tradable Instrument CalendarSpread2-3's Possible Values? |
|---|---|---|---|
| Possible Solution 1 | C1Bid, C2Bid, C3Bid | C2Bid-C3Bid | Yes |
| Possible Solution 2 | C1Bid, C2Offer, C3Bid | C2Offer-C3Bid | NO |
| *Possible Solution 3 Eliminated due to first filter* | *C1Tick1, C2Bid, C3Bid* | Not Calculated | Not Calculated |
| *Possible Solution 4 Eliminated due to second filter* | *C1Tick1, C2Offer, C3Offer* | Not Calculated | Not Calculated |
| *Possible Solution 5 Eliminated due to first filter* | *C1Offer, C2Bid, C3Bid* | Not Calculated | Not Calculated |
| *Possible Solution 6 Eliminated due to second filter* | *C1Offer, C2Offer, C3Bid* | Not Calculated | Not Calculated |
| Potential Solution 7 | C1Bid, C2Bid, C3Offer | C2Bid-C3Offer | NO |
| *Potential Solution 8 Eliminated due to second filter* | *C1Bid, C2Offer, C3Offer* | Not Calculated | Not Calculated |
| Potential Solution 9 | C1Tick1, C2Offer, C3Offer | C2Offer-C3Offer | Yes |

Fig. 22A

Matrix 6

| | Contract1, Contract2, Contract3 Possible Values | Implied Spread Value between Contract2 and Contract3 | Third Filter: Is the Implied Spread Value between Contract2 and Contract3 Valid for the Tradable Instrument CalendarSpread2-3's Possible Values? |
|---|---|---|---|
| Possible Solution 1 | C1Bid, C2Bid, C3Bid | C2Bid-C3Bid | Yes |
| ~~Possible Solution 2~~ Eliminated due to third filter | ~~C1Bid, C2Offer, C3Bid~~ | ~~C2Offer-C3Bid~~ | ~~No~~ |
| ~~Possible Solution 3~~ Eliminated due to first filter | ~~C1Tick1, C2Bid~~ | Not Calculated | Not Calculated |
| ~~Possible Solution 4~~ Eliminated due to second filter | ~~C1Offer, C2Bid~~ | Not Calculated | Not Calculated |
| ~~Possible Solution 5~~ Eliminated due to first filter | ~~C1Offer, C2Offer, C3Offer~~ | Not Calculated | Not Calculated |
| ~~Possible Solution 6~~ Eliminated due to first filter | ~~C1Bid, C2Bid, C3Offer~~ | Not Calculated | Not Calculated |
| ~~Potential Solution 7~~ Eliminated due to third filter | ~~C1Bid, C2Bid, C3Offer~~ | ~~C2Bid-C3Offer~~ | ~~No~~ |
| ~~Potential Solution 8~~ Eliminated due to second filter | ~~C1Bid, C2Offer, C3Offer~~ | Not Calculated | Not Calculated |
| Potential Solution 9 | C1Tick1, C2Offer, C3Offer | C2Offer-C3Offer | Yes |

Fig. 22B

| ButterflySpread1-2-3 Tradable Market | BS1-2-3Bid | BS1-2-3Offer |
|---|---|---|

| ButterflySpread1-2-3 Possible Values | BS1-2-3Bid | BS1-2-3Offer |
|---|---|---|

Matrix 6

| | Contract1, Contract2, Contract3 Possible Values | Implied Butterfly Spread Value Between Contract1, Contract2 and Contract3 | Fourth Filter: Is the Implied Butterfly Spread Value Between Contract1, Contract2 and Contract3 Valid for the Tradable Instrument ButterflySpread1-2-3's Possible Values? |
|---|---|---|---|
| Possible Solution 1 | C1Bid, C2Bid, C3Bid | C1Bid-2xC2Bid+C3Bid | NO |
| ~~Possible Solution 2~~ Eliminated due to third filter | ~~C1Bid, C2Offer, C3Bid~~ | Not Calculated | Not Calculated |
| ~~Possible Solution 3~~ Eliminated due to first filter | ~~C1Tick1, C2Offer, C3Bid~~ | Not Calculated | Not Calculated |
| ~~Possible Solution 4~~ Eliminated due to first filter | ~~C1Tick1, C2Bid, C3Bid~~ | Not Calculated | Not Calculated |
| ~~Possible Solution 5~~ Eliminated due to first filter | ~~C1Offer, C2Bid, C3Bid~~ | Not Calculated | Not Calculated |
| ~~Possible Solution 6~~ Eliminated due to first filter | ~~C1Offer, C2Offer, C3Bid~~ | Not Calculated | Not Calculated |
| ~~Potential Solution 7~~ Eliminated due to third filter | ~~C1Bid, C2Bid, C3Offer~~ | Not Calculated | Not Calculated |
| ~~Potential Solution 8~~ Eliminated due to second filter | ~~C1Bid, C2Offer, C3Offer~~ | Not Calculated | Not Calculated |
| Potential Solution 9 | C1Tick1, C2Offer, C3Offer | C1Tick1-2xC2Offer+C3Offer | Yes |

| | Matrix 6 | | |
|---|---|---|---|
| | Contract1, Contract2, Contract3 Possible Values | Implied Butterfly Spread Value Between Contract1, Contract2 and Contract3 | Fourth Filter: Is the Implied Butterfly Spread Value Between Contract1, Contract2 and Contract3 Valid for the Tradable Instrument CalendarSpread2-3's Possible Values? |
| ~~Possible Solution 1~~ Eliminated due to fourth filter | ~~C1Bid, C2Bid, C3Bid~~ | ~~C1Bid-2xC2Bid+C3Bid~~ | no |
| ~~Possible Solution 2~~ Eliminated due to third filter | ~~C1Bid, C2Offer, C3Bid~~ | Not Calculated | Not Calculated |
| ~~Possible Solution 3~~ Eliminated due to first filter | ~~C1Tick1, C3Bid~~ | Not Calculated | Not Calculated |
| ~~Possible Solution 4~~ Eliminated due to second filter | ~~C1Tick1, C2Offer, C3Bid~~ | Not Calculated | Not Calculated |
| ~~Possible Solution 5~~ Eliminated due to first filter | ~~C1Offer, C3Offer~~ | Not Calculated | Not Calculated |
| ~~Possible Solution 6~~ Eliminated due to third filter | ~~C1Bid, C2Bid, C3Offer~~ | Not Calculated | Not Calculated |
| ~~Possible Solution 7~~ Eliminated due to second filter | ~~C1Bid, C2Offer, C3Offer~~ | Not Calculated | Not Calculated |
| Potential Solution 9 | C1Tick1, C2Offer, C3Offer | C1Tick1-2xC2Offer+C3Offer | Yes |

| Matrix 6 | |
|---|---|
| | Contract1, Contract2, Contract3 Possible Values |
| Potential Solution 9 | C1Tick1, C2Offer, C3Offer |

Fig. 23C

| | Bid | Offer |
|---|---|---|
| June Contract Outright Market | 9969 | 9969.50 |
| September Contract Outright Market | 9956.50 | 9957 |

Fig. 24

| | Solutions that are Valid for Both June and September Contract Markets | Implied Calendar Spread Value for each Possible Solution |
|---|---|---|
| Possible Solution 1 | 9969, 9956.50 | 9969-9956.50=12.5 |
| Possible Solution 2 | 9969, 9957 | 9969-9957=12 |
| Possible Solution 3 | 9969.50, 9956.50 | 9969.50-9956.50=13 |
| Possible Solution 4 | 9969.50, 9957 | 9969.50-9957=12.5 |

Fig. 25

| June to September Tradable Calendar Spread Market | |
|---|---|
| Bid | Offer |
| 12 | 12.5 |

| | Solutions that are Valid for Both June and September Contract Markets | Implied June-September Calendar Spread Value for each Possible Solution | First Filter: Is the implied Calendar Spread Value for each Possible Solution Valid for the June to September Calendar Spread Market Possible Values? |
|---|---|---|---|
| Possible Solution 1 | 9969, 9956.50 | 9969-9956.50=12.5 | Yes |
| Possible Solution 2 | 9969, 9957 | 9969-9957=12 | Yes |
| Possible Solution 3 | 9969.50, 9956.50 | 9969.50-9956.50=13 | NO |
| Possible Solution 4 | 9969.50, 9957 | 9969.50-9957=12.5 | Yes |

Fig. 26A

| | Solutions that are Valid for Both June and September Contract Markets | Implied June-September Calendar Spread Value for each Possible Solution | First Filter: Is the Implied June-September Calendar Spread Value for each Possible Solution Valid for the June to September Calendar Spread Market Possible Values? |
|---|---|---|---|
| Possible Solution 1 | 9969, 9956.50 | 9969-9956.50=12.5 | Yes |
| Possible Solution 2 | 9969, 9957 | 9969-9957=12 | Yes |
| ~~Possible Solution 3~~ | ~~9969.50, 9956.50~~ | ~~9969.50-9956.50=13~~ | ~~No~~ |
| Possible Solution 4 | 9969.50, 9957 | 9969.50-9957=12.5 | Yes |

Fig. 26B

| December Contract Outright Market | Bid | Offer |
|---|---|---|
| | 9969 | 9939.50 |

| | Solutions that are Valid for June, September and December Contract Markets | Implied June-December Calendar Spread Value for each Possible Solution |
|---|---|---|
| Possible Solution 1 | 9969, 9958.50, 9939 | 9969-9939=30 |
| Possible Solution 2 | 9969, 9957, 9939 | 9969-9939=30 |
| ~~Possible Solution 3~~ | *Not Calculated* | *Not Calculated* |
| Possible Solution 4 | 9969.50, 9957, 9939 | 9969.50-9939=30.5 |
| Possible Solution 5 | 9969, 9958.50, 9939.50 | 9969-9939.50=29.5 |
| Possible Solution 6 | 9969, 9957, 9939.50 | 9969-9939.50=29.5 |
| Possible Solution 7 | 9969.50, 9957, 9939.50 | 9969.50-9939.50=30 |

Fig. 27

| June to December Tradable Calendar Spread Market | Bid | Offer |
|---|---|---|
| | 29.5 | 30 |

| | Solutions that are Valid for June, September and December Contract Markets | Implied June-December Calendar Spread Value for each Possible Solution | Second Filter: Is the implied June-December Calendar Spread Value for each Possible Solution Valid for the June to December Tradable Calendar Spread Market Possible Values? |
|---|---|---|---|
| Possible Solution 1 | 9969, 9950.50, 9939 | 9969-9939=30 | Yes |
| Possible Solution 2 | 9969, 9957, 9939 | 9969-9939=30 | Yes |
| ~~Possible Solution 3~~ | ~~Not Calculated~~ | ~~Not Calculated~~ | Not Calculated |
| ~~Possible Solution 4~~ | ~~9969.50, 9957, 9939~~ | ~~9969.50-9939=30.5~~ | ~~No~~ |
| Possible Solution 5 | 9969, 9956.50, 9939.50 | 9969-9939.50=29.5 | Yes |
| Possible Solution 6 | 9969, 9957, 9939.50 | 9969-9939.50=29.5 | Yes |
| Possible Solution 7 | 9969.50, 9957, 9939.50 | 9969.50-9939.50=30 | Yes |

Fig. 28

| September to December Tradable Calendar Spread Market | |
|---|---|
| Bid | Offer |
| 17.5 | 18 |

| | Solutions that are Valid for June, September and December Contract Markets | Implied September-December Calendar Spread Value for each Possible Solution | Second Filter: Is the Implied September-December Calendar Spread Value for each Possible Solution Valid for September to December Tradable Calendar Spread Market Possible Values? |
|---|---|---|---|
| Possible Solution 1 | 9969, 9956.50, 9939 | 9956.50-9939=17.5 | Yes |
| Possible Solution 2 | 9969, 9957, 9939 | 9957-9939=18 | Yes |
| Possible Solution 3 | ~~9969.50, 9957, 9939~~ | *Not Calculated* | *Not Calculated* |
| Possible Solution 4 | ~~9969.50, 9957, 9939~~ | *Not Calculated* | *Not Calculated* |
| Possible Solution 5 | 9969, 9956.50, 9939.50 | 9956.50-9939.50=17 | Yes |
| Possible Solution 6 | 9969, 9957, 9939.50 | 9957-9939.50=17.5 | Yes |
| Possible Solution 7 | 9969.50, 9957, 9939.50 | 9957-9939.50=17.5 | Yes |

Fig. 29

| June, September, December Tradable Butterfly Spread Market | Bid | Offer |
|---|---|---|
| | -5.5 | -5 |

| | Solutions that are Valid for June, September and December Contract Markets | Implied June-September-December Butterfly Spread Value for each Possible Solution | Second Filter: Is the implied June-September-December Butterfly Spread Value for each Possible Solution Valid for June, September, December Tradable Butterfly Spread Market Possible Values? |
|---|---|---|---|
| Possible Solution 1 | 9959, 9958.50, 9939 | 9959-2x9958.50+9939= -5 | Yes |
| Possible Solution 2 | 9959, 9957, 9939 | 9959-2x9957+9939= -6 | No |
| ~~Possible Solution 3~~ | ~~9959.50, 9957, 9939~~ | Not Calculated | Not Calculated |
| Possible Solution 4 | 9959, 9958.50, 9939.50 | 9959-2x9958.50+9939.50= -4.5 | No |
| Possible Solution 5 | 9959, 9957, 9939.50 | 9959-2x9957+9939.50= -5.5 | Yes |
| Possible Solution 6 | 9959.50, 9957, 9939.50 | 9959.50-2x9957+9939.50= -5 | Yes |

Fig. 30

| | Solutions that are Valid for June, September and December Contract Markets | Implied June-September-December Butterfly Spread Value for each Possible Solution | Second Filter: Is Implied June-September-December Butterfly Spread Value for each Possible Solution Valid for June, September, December Tradable Butterfly Spread Market Possible Values? |
|---|---|---|---|
| Possible Solution 1 | 9969, 9956.50, 9939 | 9969-2x9956.50+9939= -5 | Yes |
| ~~Possible Solution 2~~ | ~~9969, 9957, 9939~~ | ~~9969-2x9957+9939= -6~~ | ~~No~~ |
| ~~Possible Solution 3~~ | ~~Not Calculated~~ | ~~Not Calculated~~ | ~~Not Calculated~~ |
| ~~Possible Solution 4~~ | ~~9969.50, 9957, 9939~~ | ~~Not Calculated~~ | ~~Not Calculated~~ |
| ~~Possible Solution 5~~ | ~~9969, 9956.50, 9939.50~~ | ~~9969-2x9956.50+9939.50= -4.5~~ | ~~No~~ |
| Possible Solution 6 | 9969, 9957, 9939.50 | 9969-2x9957+9939.50= -5.5 | Yes |
| Possible Solution 7 | 9969.50, 9957, 9939.50 | 9969.50-2x9957+9939.50= -5 | Yes |

Fig. 31

|  | Solution 1 | Solution 2 | Volume Weighted Average Price | Absolute Value of difference between Solution 1 price and VWAP | Absolute Value of difference between Solution 2 price and VWAP |
| --- | --- | --- | --- | --- | --- |
|  | Contract1Price1 = 11 | Contract1Price2 = 8 | Contract1VWAP = 12 | \|Contract1Price1 - Contract1VWAP\| = 1 | \|Contract1Price2 - Contract2VWAP\| = 4 |
|  | Contract2Price1 = 19 | Contract2Price2 = 16 | Contract2VWAP = 15 | \|Contract2Price1 - Contract1VWAP\| = 4 | \|Contract2Price2 - Contract2VWAP\| = 1 |
|  | Contract3Price1 = 4 | Contract3Price2 = 6 | Contract3VWAP = 7 | \|Contract3Price1 - Contract1VWAP\| = 3 | \|Contract3Price2 - Contract2VWAP\| = 1 |
| Overall Deviation of Solution Price from VWAP |  |  |  | 1+4+3 = 8 | 4+1+1 = 6 |
| Overall Weighted Deviation of Solution price from VWAP |  |  |  | 1*3+4*2+3*1=14 | 4*3+1*2+1*1 = 15 |

Fig. 32

SYSTEMS AND METHODS FOR ITERATIVE OPTIMIZATION OF RELATED OBJECTS

REFERENCE TO RELATED APPLICATIONS

This application is a continuation under 37 C.F.R. 1.53(b) of U.S. patent application Ser. No. 16/535,617 filed Aug. 8, 2019 now U.S. Pat. No. 11,205,224, which is a continuation under 37 C.F.R. 1.53(b) of U.S. patent application Ser. No. 15/000,793 filed Jan. 19, 2016, now U.S. Pat. No. 10,430,881, which are hereby incorporated by reference in its entirety and relied upon.

BACKGROUND

Computer processing speeds depend in large part on the amount of data being processed and the complexity of the operations and processing being performed on the data. Some computing systems include many, e.g., hundreds or thousands, of objects of differing types, and attempt to compute values for the objects. Some of the objects may be related or based on other objects, and the system environment may impose rules and restrictions on the objects. For computers handling multiple inter-related objects having different rules and restrictions, it is a challenge to efficiently process and compute final values for the objects. Reducing or minimizing the number of data sets and/or operations performed thereon can increase processing efficiency.

A computer tasked with calculating values and optimizing values based on rules and restrictions may follow a set of procedures, routines, or sub-routines to arrive at the final values. The optimization process may be computationally intensive depending on how many values the computer must consider to arrive at the final values. In many cases, a computer process may run a specified process or routine which results in multiple potential solution values for the objects. The computer process may then have a choice or some flexibility regarding the final object values that are output. Unless the computer is configured to optimize the selected object values, the computer may be forced to select values at random, which may lead to sub-optimal values, or use a brute-force technique to sort through all the combinations which leads to performance degradation and delays. Processing delays may undermine any benefit from selecting proper object values.

A computer calculation process that is constrained by rules or boundaries to optimize values can become much more efficient if the number of data sets being considered can be intelligently reduced.

Accordingly, there is a need for systems and methods that can optimize object values for inter-related objects in an efficient and timely manner, so that the optimized object solutions justify any increase in processing time due to the optimization.

BRIEF DESCRIPTION OF THE DRAWINGS

FIG. 17A depicts example data structures for a contract's outright market and possible values in accordance with the disclosed embodiments.

FIG. 17B depicts example data structures for a contract's outright market and possible values in accordance with the disclosed embodiments.

FIG. 18A depicts an example data structure for an example solutions matrix for multiple contracts in accordance with the disclosed embodiments.

FIG. 18B depicts an example data structure for an example solutions matrix for multiple contracts in accordance with the disclosed embodiments.

FIG. 19A depicts example data structures for a spread instrument's market and possible values and an example solutions matrix for multiple contracts in accordance with the disclosed embodiments.

FIG. 19B depicts an example data structure for an example solutions matrix for multiple contracts in accordance with the disclosed embodiments.

FIG. 20 depicts example data structures for a contract's outright market and possible values and example solutions matrix for multiple contracts in accordance with the disclosed embodiments.

FIG. 21A depicts example data structures for a spread instrument's market and possible values and an example solutions matrix for multiple contracts in accordance with the disclosed embodiments.

FIG. 21B depicts an example data structure for an example solutions matrix for multiple contracts in accordance with the disclosed embodiments.

FIG. 22A depicts example data structures for a spread instrument's market and possible values and an example solutions matrix for multiple contracts in accordance with the disclosed embodiments.

FIG. 22B depicts an example data structure for an example solutions matrix for multiple contracts in accordance with the disclosed embodiments.

FIG. 23A depicts example data structures for a spread instrument's market and possible values and an example solutions matrix for multiple contracts in accordance with the disclosed embodiments.

FIG. 23B depicts an example data structure for an example solutions matrix for multiple contracts in accordance with the disclosed embodiments.

FIG. 23C depicts an example data structure for an example solutions matrix for multiple contracts in accordance with the disclosed embodiments.

FIG. 24 depicts an example data structure for the outright market for a June and September contract in accordance with the disclosed embodiments.

FIG. 25 depicts an example data structure for the possible solutions for the settlement prices of the June and September contracts in accordance with the disclosed embodiments.

FIG. 26A depicts an example data structure for the market for the June-September spread instrument and an example data structure for the possible solutions for the settlement prices of the June and September contracts in accordance with the disclosed embodiments.

FIG. 26B depicts an example data structure for the possible solutions for the settlement prices of the June and September contracts in accordance with the disclosed embodiments.

FIG. 27 depicts an example data structure for the possible solutions for the settlement prices of the June, September, and December contracts in accordance with the disclosed embodiments.

FIG. 28 depicts example data structures for the market for the June-December spread instrument and an example data structure for the possible solutions for the settlement prices of the June, September, and December contracts in accordance with the disclosed embodiments.

FIG. 29 depicts example data structures for the market for the September-December spread instrument and an example data structure for the possible solutions for the settlement prices of the June, September, and December contracts in accordance with the disclosed embodiments.

FIG. 30 depicts example data structures for the market for the June, September and December spread instrument and an example data structure for the possible solutions for the settlement prices of the June, September, and December contracts in accordance with the disclosed embodiments.

FIG. 31 depicts an example data structure for the possible solutions for the settlement prices of the June, September, and December contracts in accordance with the disclosed embodiments.

FIG. 32 depicts an example data structure for determining the deviation and weighted deviation of contract solution prices from contract volume weighted average prices in accordance with the disclosed embodiments.

DETAILED DESCRIPTION

Figure 1:
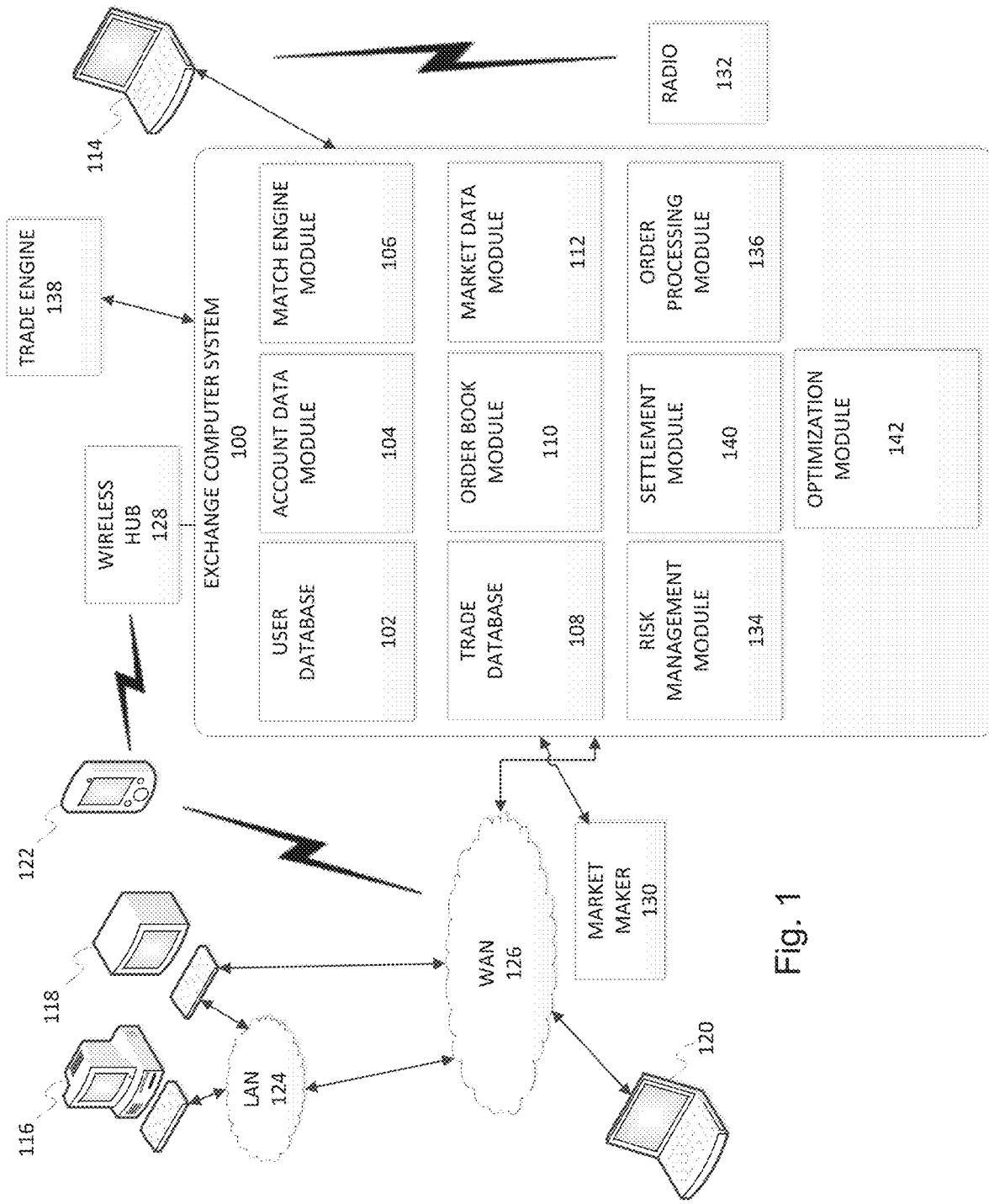
FIG. 1 depicts an illustrative computer network system that may be used to implement aspects of the disclosed embodiments.

The disclosed embodiments relate generally to selecting optimum values for inter-related objects, e.g., objects influencing and/or dependent upon other system objects, when a computer process computes multiple potential values for each object. Specifically, the disclosed embodiments optimize overall system performance by determining and selecting object values that conform to pre-defined rules and/or relationships between different objects, including identifying and discarding object values that deviate from or otherwise result in a violation of the pre-defined rules and relationships.

Thus, the disclosed embodiments reduce the load on a computer by identifying and eliminating solutions that would result in undesirable object relationships. In other words, the disclosed embodiments rely on desirable object relationships to select object values, so that the selected object values result in the desired object relationships. The desired object relationships may be derived from data input into the system. In one embodiment, the desired object relationships reflect a high level of overall system performance and user satisfaction.

In one embodiment, the disclosed embodiments may be implemented to determine object values so that a maximum number of inter-object transactions can be enabled and do so in an iterative process that conserves computing time and resources. The relationship logic may be pre-configured into a computer, such that the computer optimizes its solutions to conform to as many of the pre-configured logic or criterion as it can. In one embodiment, the object relationships are ranked or are hierarchal in nature, and the computing systems begins with the highest ranked relationship and attempts to meet its rules, then processes the second-highest ranked relationship, and so on. Any object optimization performed during processing of the highest relationship is used during processing of the second relationship. In other words, instead of processing each object relationship separately and independently, the relationship rules are prioritized, and results of processing the highest priority relationship are used during processing of the second highest priority relationship, and the results after processing the second highest priority relationship are used during processing of the third highest priority relationship, and so on until optimum values are determined, or until all of the relationship rules are processed. In one embodiment, if there are multiple solutions for an object value even after all the relationship rules have been processed, the computing system may add additional rules, e.g., based on historical object values, to optimize the final solution.

Objects may be implemented in code, using, among other things, a tangible computer-readable medium comprising computer-executable instructions (e.g., executable software code). Alternatively, objects may be implemented as software code, firmware code, specifically configured hardware or processors, and/or a combination of the aforementioned. An object may be implemented and stored as a set of related data, e.g., a database. Objects may be implemented using a pre-defined data structure. An object may be implemented as an instance of a class that contains data and methods for processing the data. For example, an object may be a self-contained entity that includes data and procedures to manipulate the data. An object may be any item in the computing environment that can be individually manipulated, selected, or processed. Objects may be exposed as shapes, pictures, or words in a display screen or in a user interface.

One exemplary environment where optimizing computer processing of related objects is desirable is in financial markets, and in particular, electronic financial exchanges, such as a futures exchange, such as the Chicago Mercantile Exchange Inc. (CME). In particular, an exchange may offer multiple products and contracts for purchase that may be represented as objects in the computing system. The associated costs and values of objects may be considered to be related data sets. An exchange computer system may also be constrained by the tradable positions of markets, such as for example, bid and ask values for the different contracts, available on the exchange.

A financial instrument trading system, such as a futures exchange, such as the Chicago Mercantile Exchange Inc. (CME), provides a contract market where financial instruments, e.g., futures and options on futures, are traded using electronic systems. "Futures" is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option contract is the right, but not the obligation, to sell or buy the underlying instrument (in this case, a futures contract) at a specified price within a specified time. The commodity to be delivered in fulfillment of the contract, or alternatively the commodity for which the cash market price shall determine the final settlement price of the futures contract, is known as the contract's underlying reference or "underlier." The terms and conditions of each futures contract are standardized as to the specification of the contract's underlying reference commodity, the quality of such commodity, quantity, delivery date, and means of contract settlement. Cash settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract price. Options and futures may be based on more generalized market indicators, such as stock indices, interest rates, futures contracts, and other derivatives.

An exchange may provide for a centralized "clearing house" through which trades made must be confirmed, matched, and settled each day until offset or delivered. The clearing house may be an adjunct to an exchange, and may be an operating division of an exchange, which is responsible for settling trading accounts, clearing trades, collecting, and maintaining performance bond funds, regulating delivery, and reporting trading data. One of the roles of the clearing house is to mitigate credit risk. Clearing is the procedure through which the clearing house becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the clearing house.

The clearing house of an exchange clears, settles and guarantees matched transactions in contracts occurring through the facilities of the exchange. In addition, the clearing house establishes and monitors financial requirements for clearing members and conveys certain clearing privileges in conjunction with the relevant exchange markets.

The clearing house establishes clearing level performance bonds (margins) for all products of the exchange and establishes minimum performance bond requirements for customers of such products. A performance bond, also referred to as a margin requirement, corresponds with the funds that must be deposited by a customer with his or her broker, by a broker with a clearing member or by a clearing member with the clearing house, for the purpose of insuring the broker or clearing house against loss on open futures or options contracts. This is not a part payment on a purchase. The performance bond helps to ensure the financial integrity of brokers, clearing members and the exchange as a whole. The performance bond refers to the minimum dollar deposit required by the clearing house from clearing members in accordance with their positions. Maintenance, or maintenance margin, refers to a sum, usually smaller than the initial performance bond, which must remain on deposit in the customer's account for any position at all times. The initial margin is the total amount of margin per contract required by the broker when a futures position is opened. A drop-in funds below this level requires a deposit back to the initial margin levels, i.e., a performance bond call. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance.

The exchange derives its financial stability in large part by removing debt obligations among market participants as they occur. This is accomplished by determining a settlement price at the close of the market each day for each contract and marking all open positions to that price, referred to as "mark to market." Every contract is debited or credited based on that trading session's gains or losses. As prices move for or against a position, funds flow into and out of the trading account. In the case of the CME, each business day by 6:40 a.m. Chicago time, based on the mark-to-the-market of all open positions to the previous trading day's settlement price, the clearing house pays to or collects cash from each clearing member. This cash flow, known as settlement variation, is performed by CME's settlement banks based on instructions issued by the clearing house. All payments to and collections from clearing members are made in "same-day" funds. In addition to the 6:40 a.m. settlement, a daily intra-day mark-to-the market of all open positions, including trades executed during the overnight GLOBEX®, the CME's electronic trading systems, trading session and the current day's trades matched before 11:15 a.m., is performed using current prices. The resulting cash payments are made intra-day for same day value. In times of extreme price volatility, the clearing house has the authority to perform additional intra-day mark-to-the-market calculations on open positions and to call for immediate payment of settlement variation. CME's mark-to-the-market settlement system differs from the settlement systems implemented by many other financial markets, including the interbank, Treasury securities, over-the-counter foreign exchange and debt, options, and equities markets, where participants regularly assume credit exposure to each other. In those markets, the failure of one participant can have a ripple effect on the solvency of the other participants. Conversely, CME's mark-to-the-market system does not allow losses to accumulate over time or allow a market participant the opportunity to defer losses associated with market positions.

In order to minimize risk to the exchange while minimizing the burden on members, it is desirable to approximate the requisite performance bond or margin requirement as closely as possible to the actual positions of the account at any given time. An exchange may use a settlement method to determine the position of a contract. It may be difficult to quickly and efficiently select the best settlement price when multiple potential settlement prices can be used. For example, when multiple potential settlement prices can be used, differentiating between the multiple potential settlement prices may be a time-consuming task, or the logic for determining the best settlement price may be context or case specific.

With some spread instruments, the market is sufficiently inactive during or at the end of the trading day. Very little, if any, trades may occur during a given day. In such cases, because of low liquidity and trading activity, it may be difficult to determine daily settlement prices for purposes of accurately estimating performance bond requirements. Thus, the exchange may determine a settlement price based on other market conditions. In many cases, the logic used to determine a settlement price for a contract may result in multiple viable or possible settlement prices. When multiple settlement prices all conform to or are valid for the outright market for a contract, the exchange may have a choice or some flexibility regarding the settlement price that is selected for a contract. As used herein, prices may be considered to be valid, for example, for an existing market or contract if the prices are equivalent to the bid or the ask for that contract, or if the prices are the same as one of the ticks between the bid and the ask for that contract.

While the disclosed embodiments may be discussed in relation to futures and/or options on futures trading, it should be appreciated that the disclosed embodiments may be applicable to any equity, fixed income security, currency, commodity, options or futures trading system or market now available or later developed. It should be appreciated that a trading environment, such as a futures exchange as described herein, implements one or more economic markets where rights and obligations may be traded. As such, a trading environment may be characterized by a need to maintain market integrity, transparency, predictability, fair/equitable access, and participant expectations with respect thereto. For example, an exchange must respond to inputs, such as trader orders, cancelations, etc., in a manner as expected by the market participants, such as based on market data, e.g., prices, available counter-orders, etc., to provide an expected level of certainty that transactions will occur in a consistent and predictable manner and without unknown or unascertainable risks. In addition, it should be appreciated that electronic trading systems further impose additional expectations and demands by market participants as to transaction processing speed, latency, capacity, and response time, while creating additional complexities relating thereto. Accordingly, as will be described, the disclosed embodiments may further include functionality to ensure that the expectations of market participants are met, e.g., that transactional integrity and predictable system responses are maintained.

As was discussed above, electronic trading systems ideally attempt to offer an efficient, fair and balanced market where market prices reflect a true consensus of the value of products traded among the market participants, where the intentional or unintentional influence of any one market participant is minimized if not eliminated, and where unfair or inequitable advantages with respect to information access are minimized if not eliminated.

Although described below in connection with examples involving instruments having multiple components, such as calendar and butterfly spread instruments, the methods described herein are well suited for determining final values for any variety of objects conforming to a set of rules or relationships, such as for example, determining settlement prices for a variety of instruments based on a related market.

Generally, the disclosed embodiments may be applicable to any computer processing system that is constrained by a variety of rules and data values. When a computer processor attempts to compute a large number of data sets in an environment including rules constraints and data constraints, the number of possible solutions or combinations of values can become unwieldy.

The disclosed embodiments may be applicable to contracts for any type of underlier commodity, equity, option, or futures trading system or market now available or later developed. The disclosed embodiments are also not limited to intra-market spread instruments, and accordingly may also be used in connection with inter-market spread instruments for contracts associated with different commodities.

While the disclosed embodiments may be described in reference to the CME, it should be appreciated that these embodiments are applicable to any exchange. Such other exchanges may include a clearing house that, like the CME clearing house, clears, settles, and guarantees all matched transactions in contracts of the exchange occurring through its facilities. In addition, such clearing houses establish and monitor financial requirements for clearing members and convey certain clearing privileges in conjunction with the relevant exchange markets.

The disclosed embodiments are also not limited to uses by a clearing house or exchange for purposes of enforcing a performance bond or margin requirement. For example, a market participant may use the disclosed embodiments in a simulation or other analysis of a portfolio. In such cases, the settlement price may be useful as an indication of a value at risk and/or cash flow obligation rather than a performance bond. The disclosed embodiments may also be used by market participants or other entities to forecast or predict the effects of a prospective position on the margin requirement of the market participant.

The methods and systems described herein may be integrated or otherwise combined with various risk management methods and systems, such as the risk management methods and systems described in U.S. Pat. No. 7,769,667 entitled "System and Method for Activity Based Margining" (the '667 patent"), the entire disclosure of which is incorporated by reference herein and relied upon. For example, the methods and systems described herein may be configured as a component or module of the risk management systems described in the above-referenced patent. Alternatively, or additionally, the disclosed methods may generate data to be provided to the systems described in the above-referenced patent. For example, the settlement prices determined by the disclosed embodiments may be incorporated into margin requirement(s) determined by the risk management method or system.

In one embodiment, the disclosed methods and systems are integrated or otherwise combined with the risk management system implemented by CME called Standard Portfolio Analysis of Risk™ (SPAN®). The SPAN system bases performance bond requirements on the overall risk of the portfolios using parameters as determined by CME's Board of Directors, and thus represents a significant improvement over other performance bond systems, most notably those that are "strategy-based" or "delta-based." Further details regarding SPAN are set forth in the '667 patent.

In one embodiment, the disclosed embodiments may be integrated or combined with a margin model, such as a margin model different from SPAN. For example, a margin model may be implemented to generate multiple settlement prices.

The embodiments may be described in terms of a distributed computing system. The particular examples identify a specific set of components useful in a futures and options exchange. However, many of the components and inventive features are readily adapted to other electronic trading environments. The specific examples described herein may teach specific protocols and/or interfaces, although it should be understood that the principles involved may be extended to, or applied in, other protocols and interfaces.

It should be appreciated that the plurality of entities utilizing or involved with the disclosed embodiments, e.g., the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

An exemplary trading network environment for implementing trading systems and methods is shown in FIG. 1. An exchange computer system 100 receives messages that include orders and transmits market data related to orders and trades to users, such as via wide area network 126 and/or local area network 124 and computer devices 114, 116, 118, 120 and 122, as will be described below, coupled with the exchange computer system 100.

Herein, the phrase "coupled with" is defined to mean directly connected to or indirectly connected through one or more intermediate components. Such intermediate components may include both hardware and software-based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The exchange computer system 100 may be implemented with one or more mainframe, desktop, or other computers, such as the example computer 200 described below with respect to FIG. 2. A user database 102 may be provided which includes information identifying traders and other users of exchange computer system 100, such as account numbers or identifiers, usernames, and passwords. An account data module 104 may be provided which may process account information that may be used during trades.

A match engine module 106 may be included to match bid and offer prices and may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices, e.g., in a continuous auction market, or also operate as an order accumulation buffer for a batch auction market. A market data module 112 may be included to collect market data and prepare the data for transmission to users.

A risk management module 134 may be included to compute and determine a user's risk utilization in relation to the user's defined risk thresholds. The risk management module 134 may also be configured to determine risk assessments or exposure levels in connection with positions held by a market participant.

The risk management module 134 may be configured to administer, manage, or maintain one or more margining mechanisms implemented by the exchange computer system 100. Such administration, management or maintenance may include managing a number of database records reflective of margin accounts of the market participants. In some embodiments, the risk management module 134 implements one or more aspects of the disclosed embodiments, including, for instance, principal component analysis (PCA) based margining, in connection with interest rate swap (IRS) portfolios, as described below.

An order processing module 136 may be included to decompose delta-based, spread instrument, bulk, and other types of composite orders for processing by the order book module 110 and/or the match engine module 106. The order processing module 136 may also be used to implement one or more procedures related to clearing an order.

A settlement module 140 (or settlement processor or other payment processor) may be included to provide one or more functions related to settling or otherwise administering transactions cleared by the exchange. Settlement module 140 of the exchange computer system 100 may implement one or more settlement price determination techniques. Settlement-related functions need not be limited to actions or events occurring at the end of a contract term. For instance, in some embodiments, settlement-related functions may include or involve daily or other mark to market settlements for margining purposes. In some cases, the settlement module 140 may be configured to communicate with the trade database 108 (or the memory(ies) on which the trade database 108 is stored) and/or to determine a payment amount based on a spot price, the price of the futures contract or other financial instrument, or other price data, at various times. The determination may be made at one or more points in time during the term of the financial instrument in connection with a margining mechanism. For example, the settlement module 140 may be used to determine a mark to market amount on a daily basis during the term of the financial instrument. Such determinations may also be made on a settlement date for the financial instrument for the purposes of final settlement.

In some embodiments, the settlement module 140 may be integrated to any desired extent with one or more of the other modules or processors of the exchange computer system 100. For example, the settlement module 140 and the risk management module 134 may be integrated to any desired extent. In some cases, one or more margining procedures or other aspects of the margining mechanism(s) may be implemented by the settlement module 140.

An optimization module 142 may be included to select best or optimum values for contracts when multiple values all meet the criterion for other related contracts. When multiple contracts are simultaneously considered for settlement by an exchange system, and when the system determines more than one settlement price solution for a contract, it would be beneficial to the exchange to optimize the selection of the settlement price or prices such that the selected values result in desirable relationships between the contracts (e.g., values that are valid for other dependent contracts). In an environment having multiple contracts, multiple possible prices and multiple relationships, a computer system may not be able to determine an optimum solution without spending a high amount of computing time and resources.

An optimum solution or solutions may be the combination(s) of objects, e.g., contract settlement prices, that conform to a hierarchical prioritization of object relationships. The optimization module 142 may for example be utilized in conjunction with the settlement module 140 which determines a mark to market amount. The optimization module 142 in one embodiment determines which of multiple possible settlement prices, each of which could be selected as the settlement price for a contract, should be selected for a contract. The optimization module 142 in one embodiment also determines the optimum combinations of multiple contracts so that the solutions are valid for the existing markets for the contracts as well as spread relationships between the contracts, such as calendar and butterfly spreads.

It should be appreciated that concurrent processing limits may be defined by or imposed separately or in combination, as was described above, on one or more of the trading system components, including the user database 102, the account data module 104, the match engine module 106, the trade database 108, the order book module 110, the market data module 112, the risk management module 134, the order processing module 136, the settlement module 140, or other component of the exchange computer system 100.

One skilled in the art will appreciate that one or more modules described herein may be implemented using, among other things, a tangible computer-readable medium comprising computer-executable instructions (e.g., executable software code). Alternatively, modules may be implemented as software code, firmware code, specifically configured hardware or processors, and/or a combination of the aforementioned. For example, the modules may be embodied as part of an exchange 100 for financial instruments. It should be appreciated that the disclosed embodiments may be implemented as a different or separate module of the exchange computer system 100, or a separate computer system coupled with the exchange computer system 100 so as to have access to margin account record, pricing, and/or other data. As described above, the disclosed embodiments may be implemented as a centrally accessible system or as a distributed system, e.g., where some of the disclosed functions are performed by the computer systems of the market participants.

The trading network environment shown in FIG. 1 includes exemplary computer devices 114, 116, 118, 120 and 122 which depict different exemplary methods or media by which a computer device may be coupled with the exchange computer system 100 or by which a user may communicate, e.g., send and receive, trade or other information therewith. It should be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 200 described in more detail below with respect to FIG. 2, may include a central processor, specifically configured or otherwise, that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 114 is shown directly connected to exchange computer system 100, such as via a T1 line, a common local area network (LAN) or other wired and/or wireless medium for connecting computer devices, such as the network 220 shown in FIG. 2 and described below with respect thereto. The exemplary computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the exemplary computer device 114 or a user thereof. The user of the exemplary computer device 114, or the exemplary computer device 114 alone and/or autonomously, may then transmit the trade or other information to the exchange computer system 100.

Exemplary computer devices 116 and 118 are coupled with a local area network ("LAN") 124 which may be configured in one or more of the well-known LAN topologies, e.g., star, daisy chain, etc., and may use a variety of different protocols, such as Ethernet, TCP/IP, etc. The exemplary computer devices 116 and 118 may communicate with each other and with other computer and other devices which are coupled with the LAN 124. Computer and other devices may be coupled with the LAN 124 via twisted pair wires, coaxial cable, fiber optics or other wired or wireless media. As shown in FIG. 1, an exemplary wireless personal digital assistant device ("PDA") 122, such as a mobile telephone, tablet based compute device, or other wireless device, may communicate with the LAN 124 and/or the Internet 126 via radio waves, such as via WIFI, Bluetooth® and/or a cellular telephone based data communications protocol. PDA 122 may also communicate with exchange computer system 100 via a conventional wireless hub 128.

FIG. 1 also shows the LAN 124 coupled with a wide area network ("WAN") 126 which may be comprised of one or more public or private wired or wireless networks. In one embodiment, the WAN 126 includes the Internet 126. The LAN 124 may include a router to connect LAN 124 to the Internet 126. Exemplary computer device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 220 shown in FIG. 2 and described below with respect thereto.

Users of the exchange computer system 100 may include one or more market makers 130 which may maintain a market by providing constant bid and offer prices for a derivative or security to the exchange computer system 100, such as via one of the exemplary computer devices depicted. The exchange computer system 100 may also exchange information with other match or trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 116 may store computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 118 may include computer-executable instructions for receiving market data from exchange computer system 100 and displaying that information to a user.

Numerous additional servers, computers, handheld devices, personal digital assistants, telephones, and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

Figure 2:
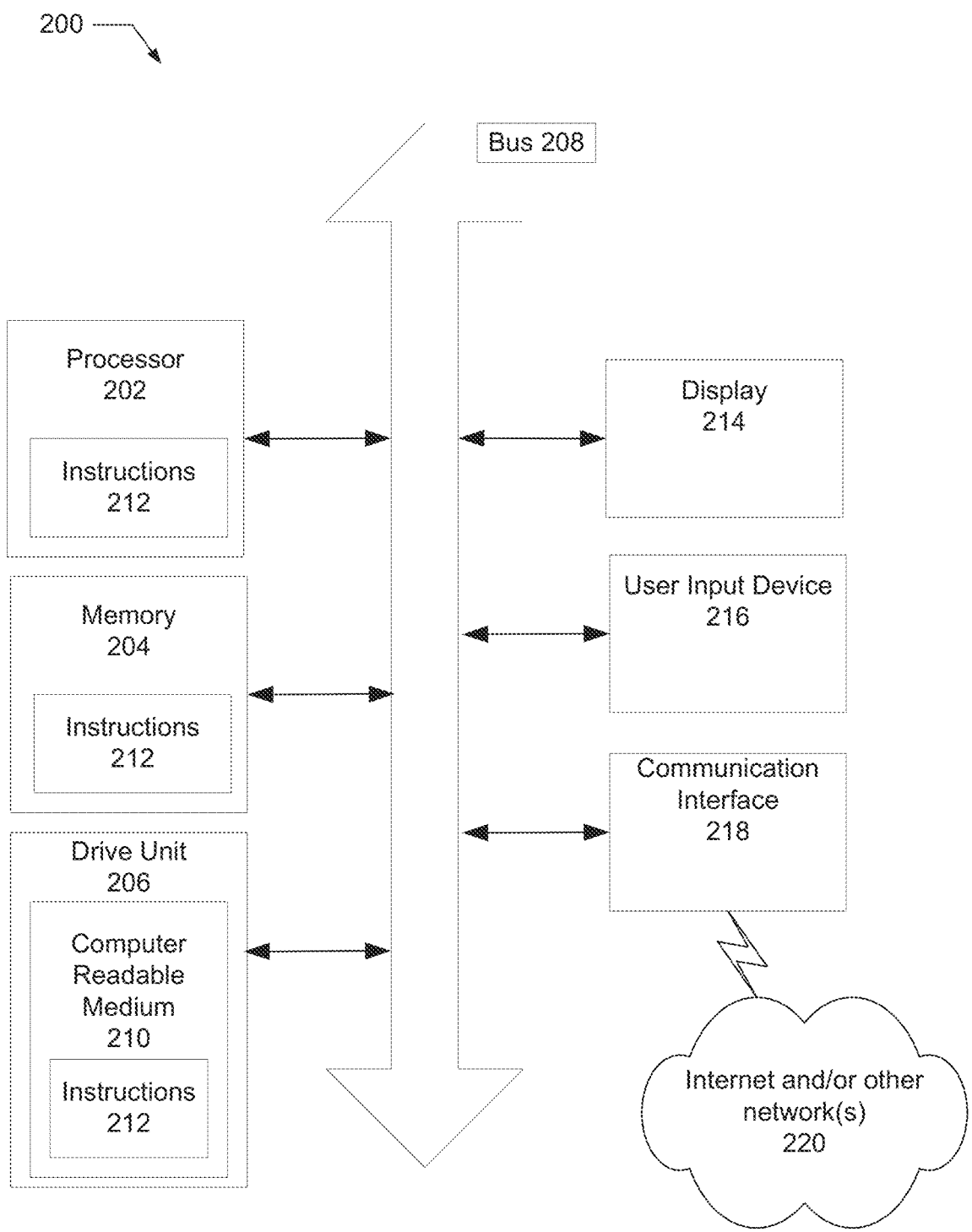
FIG. 2 depicts an illustrative embodiment of a general computer system for use with the disclosed embodiments.

Referring to FIG. 2, an illustrative embodiment of a general computer system 200 is shown. The computer system 200 can include a set of instructions that can be executed to cause the computer system 200 to perform any one or more of the methods or computer-based functions disclosed herein. The computer system 200 may operate as a standalone device or may be connected, e.g., using a network, to other computer systems or peripheral devices. Any of the components discussed above, such as the processor 202, may be a computer system 200 or a component in the computer system 200. The computer system 200 may be specifically configured to implement a match engine, margin processing, payment or clearing function on behalf of an exchange, such as the Chicago Mercantile Exchange Inc., of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 can be implemented using electronic devices that provide voice, video, or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random-access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firmware, microcode and the like, operating alone or in combination. Likewise, processing strategies may include multiprocessing, multitasking, parallel processing and the like.

As shown, the computer system 200 may further include a display unit 214, such as a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control, or any other device operative to interact with the system 200.

In a particular embodiment, as depicted in FIG. 2, the computer system 200 may also include a disk or optical drive unit 206. The disk drive unit 206 may include a computer-readable medium 210 in which one or more sets of instructions 212, e.g., software, can be embedded. Further, the instructions 212 may embody one or more of the methods or logic as described herein. In a particular embodiment, the instructions 212 may reside completely, or at least partially, within the memory 204 and/or within the processor 202 during execution by the computer system 200. The memory 204 and the processor 202 also may include computer-readable media as discussed above.

The present disclosure contemplates a computer-readable medium that includes instructions 212 or receives and executes instructions 212 responsive to a propagated signal, so that a device connected to a network 220 can communicate voice, video, audio, images, or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly as discussed below. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMax network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated or otherwise specifically configured hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical discs, or optical discs. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical discs; and CD ROM and DVD-ROM discs. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

A system may depend on certain rules, logic, and interrelated objects and data. In technical and computing environments, a system may calculate values for multiple objects subject to rules, e.g., business or environment logic, associated with the objects. Certain object types may also depend on other object types. For example, a computing environment may include multiple objects of different types, e.g., base objects and composite objects. A composite object as used herein is an object whose value depends on, is related to, or is influenced by, the values of other objects, such as base objects or other composite objects. For example, a composite object may involve transactions between multiple, e.g., two, base objects. Or, a composite object may define a relationship between other objects. Thus, composite objects depend on the values of other system objects. In one embodiment, a composite object involves or defines a transaction or relationship between at least two other objects. For example, a composite object involves or defines a transaction or relationship between two base objects.

The optimization module in one application can rapidly and efficiently determine solutions for the objects that meet predetermined rules for the objects. Predetermined rules may be programmed into the computer. An example predetermined rule may be a rule about the difference in values, e.g., the net value, between contracts. The rules may be hard rules, or system requirements. Alternatively, rules may be soft rules that are not requirements but reflect system or user preferences.

For example, the disclosed embodiments may optimize the values of base objects by considering the effects of base object values on other composite objects that are related to the base objects. Moreover, the system environment may impose restrictions on the values of the composite objects. For example, the system may impose certain performance requirements on composite objects. Or, the system may impose a minimum or maximum value for a composite object value that is based on at least two base objects' values. Thus, the system attempts to select base object values that conform to the composite object value requirement. In such a computing environment, it may be desirable to optimize overall system behavior by assigning values to objects such that rules or relationships involving the objects, e.g., composite object definitions, are met.

In one embodiment, the computing may receive values for base objects and composite objects, and the computing system attempts to select values in accordance with relationships associated with the base objects and composite objects. In particular, the system may receive high and low values for each base and composite object. Even though a composite object may define a relationship between base objects, or be related to the base objects, the values received for the composite objects may be independent of the values received for the corresponding base objects, e.g., fluctuations in the values of the corresponding base objects may have no effect on the values received for the composite object, and vice versa.

In one embodiment, the composite object values define a range of values that is then compared to the transaction results involving two base objects, discussed in further detail herein.

In one embodiment, the disclosed embodiments provide systems and methods for efficiently selecting values for or assigning values to base objects based on the received values. In one embodiment, the disclosed embodiments may utilize composite objects associated with base objects as a guide to select values for the base objects. In one embodiment, the disclosed embodiments may consider multiple base objects in conjunction. Because composite objects, in one embodiment, depend on or are related to at least two base objects, a composite object associated with at least two base objects can be exploited to determine final settlement values for the two base objects.

It should be appreciated that that the received values for base objects may be considered to be subjective values for those base objects or based on a user's perception of the base objects. The system in one embodiment chooses one of the received subjective values for the base objects to determine a best objective value for each base object, where the value selected as the final value is one of the received values. In other words, the system selects one of multiple subjective values as an objective value for that object. Said yet another way, the system attempts to select one of many possible values for an object and assigns the single selected value of the object as the final value for that object. Thus the disclosed embodiments can be applied in any system needing to decide which of multiple possible options or values should be selected as the definitive option or value, where the decision is guided by the system's environment and other objects in the system that are related to the objects in question. For example, a system including at least two base objects and one composite object can utilize the composite object to select values for the base objects.

Figure 3:
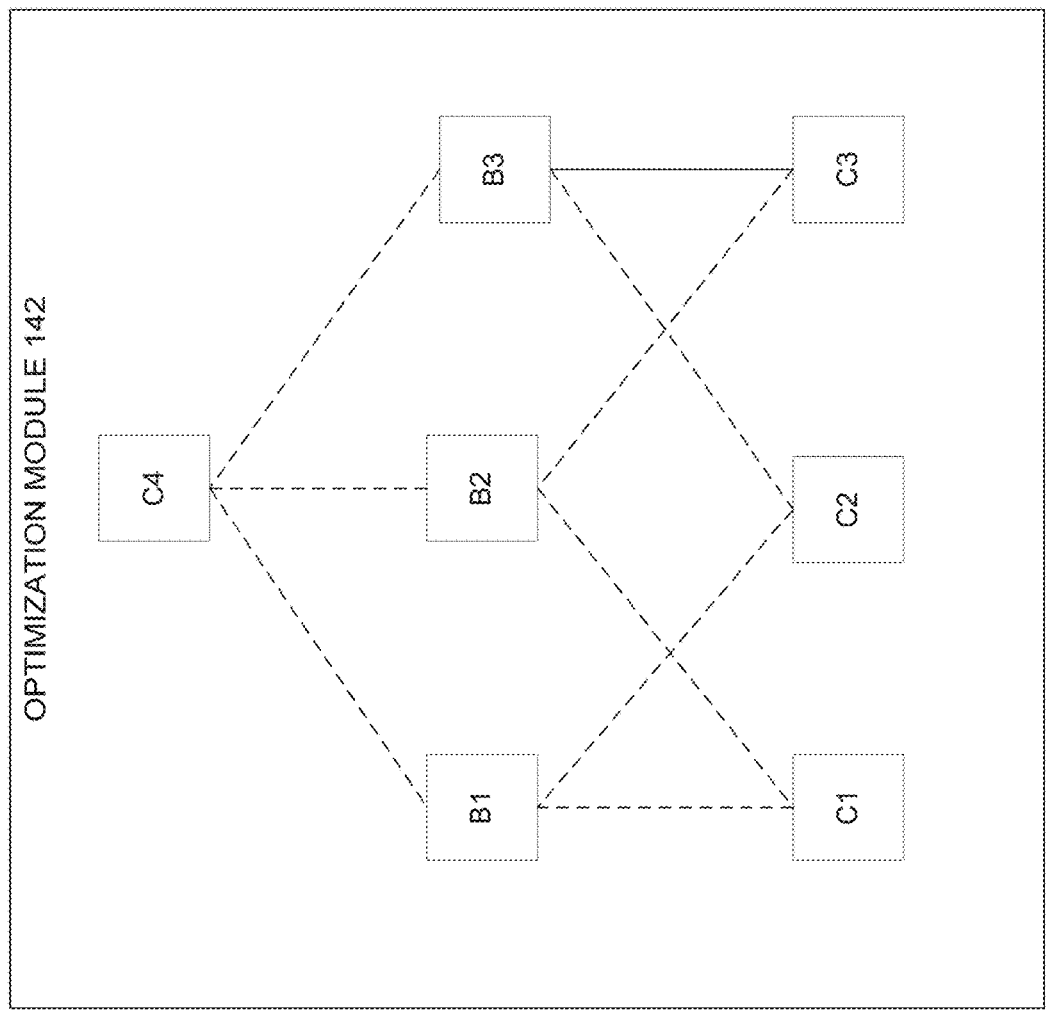
FIG. 3 depicts an example optimization module in accordance with the disclosed embodiments.

For example, as shown in FIG. 3, the optimization module of a computing system may include several base objects and composite objects, such as base objects B1, B2 and B3 and composite objects C1, C2, C3 and C4. Each composite object may be associated with two or more base objects. For example, as also shown in FIG. 3, C1 may be associated with B1 and B2, C2 may be associated with B1 and B3, C3 may be associated with B2 and B3, and C4 may be associated with B1, B2 and B3.

Although three base objects and four composite objects are illustrated in FIG. 3, the optimization module may include many more base and composite objects. In one embodiment, the number of composite objects is at least one more than the number of base objects, and at least one of the composite objects defines a relationship between all of the base objects.

Moreover, an object may be considered to be simultaneously both a base object and a composite object. For example, an object may both (i) depend upon other objects (and thus be considered a composite object) and (ii) be depended upon by other objects (and thus be considered a base object). It should be appreciated that whether an object is characterized as a base object or a composite object depends upon the relationship of that object with other objects in the computing system In one embodiment, the system may store the relationships between composite objects and base objects as equations. For example, if composite object C1 defines the net value of base objects B1 and B2, then the following equation 1 defines C1 in terms of B1 and B2:

$$C1 = B1 - B2 \qquad \text{Equation 1}$$

Figure 4:
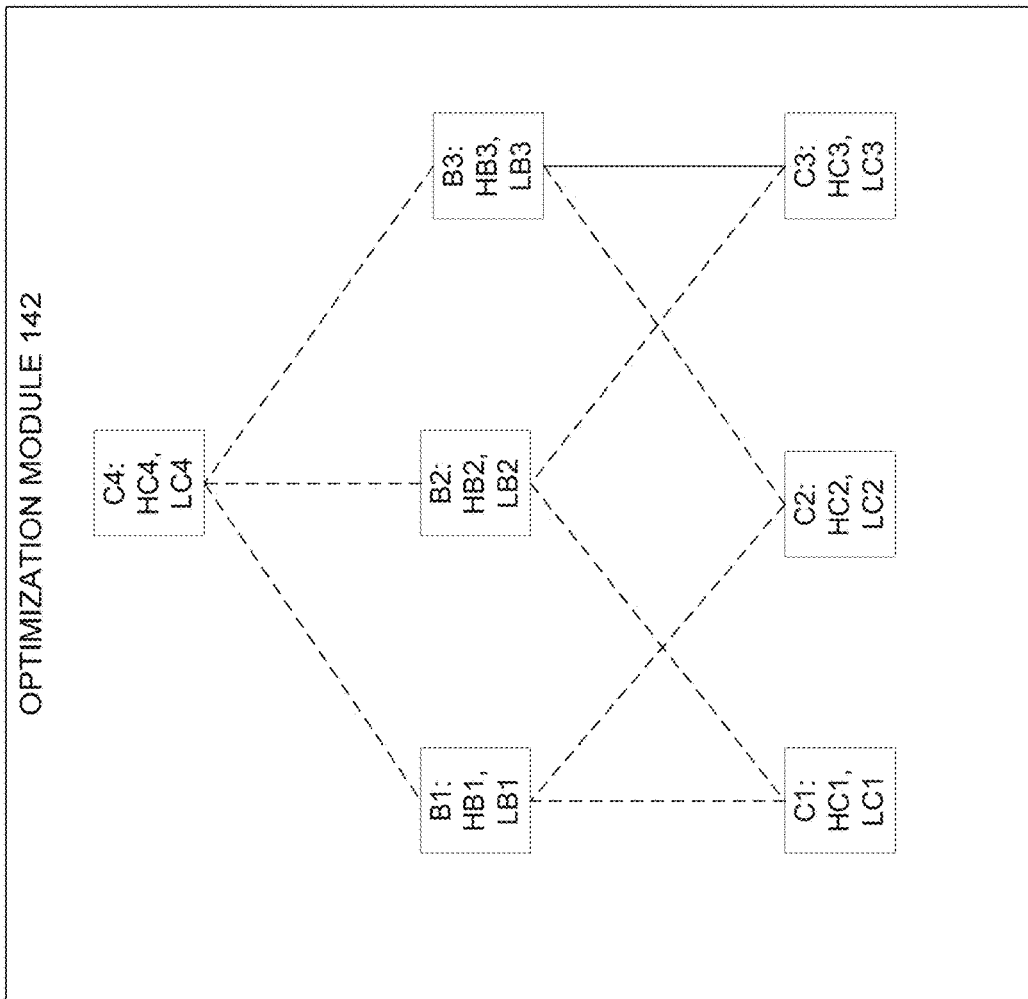
FIG. 4 depicts an example optimization module in accordance with the disclosed embodiments.

The computing system or optimization module may receive values for each of the objects. For example, as shown in FIG. 4, the optimization module may receive and store two values, high value HB1 and low value LB1, for base object B1, high value HB2 and low value LB2 for base object B2, and high value HB3 and low value LB3 for base object B3. The optimization module may also receive and store high value HC1 and low value LC1 for composite object C1, high value HC2 and low value LC2 for composite object C2, high value HC3 and low value LC3 for composite object C3, and high value HC4 and low value LC4 for composite object C4. Thus, each object may be associated with a plurality of values.

It should be appreciated that even if a composite object is associated with multiple base objects, the values received for the composite object are independent of the values received of the corresponding base objects. For example, the received values for each of C1, B1 and B2 are independent of the above equation 1. In other words, the received values for C1 are not calculated based on B1 and B2. In a financial exchange computer system, the received values may instead be based on, for example, market factors, trade data, user behavior or user predictions. Thus, it may not be the case that each value received for C1, B1 and B2 conforms to equation 1.

The disclosed embodiments attempt to filter the values of base objects so that only values of base objects that conform to equations defining composite objects are kept in the memory as possible base object values, as discussed in further detail below. Combinations of values for base objects that fail to conform to equations or relationships defined associated composite objects are eliminated from the system memory.

The optimization module then iteratively processes and analyzes combinations of multiple base objects. In particular, the optimization module generates all possible combinations of received values of multiple, e.g., two, base objects and tests each possible combination against the associated composite object received values. Again, composite objects that are associated with base objects can be said to define a desired relationship between the base objects. Any combination of values for base objects that does not result in a desired relationship between the base objects is eliminated from the memory associated with the optimization module. Such elimination reduces further processing load on the optimization module, resulting in quicker solution determination.

In one embodiment, the optimization module may eliminate solutions based on other system rules or preferences unrelated to composite objects. For example, the optimization module may eliminate solutions based on time of day or time of year. Or, the optimization module may determine probabilities for which of the possible solutions would actually be selected based on historical data, and eliminate solutions based on past performance and past solution selection.

Figure 5:
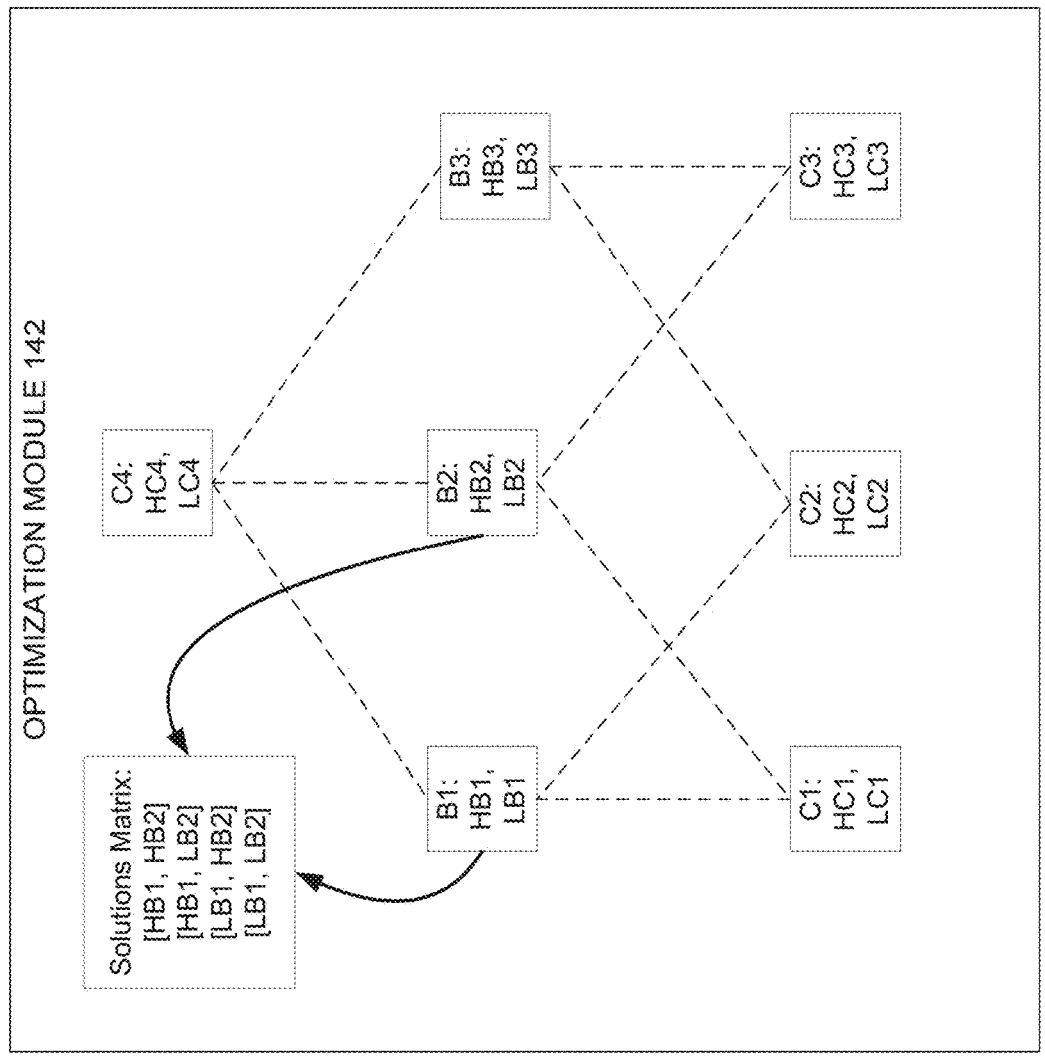
FIG. 5 depicts an example optimization module in accordance with the disclosed embodiments.

Referring to FIG. 5, the optimization module first analyzes the combination of B1 and B2, and in particular, generates a solutions matrix including all possible combinations of B1 and B2 values, namely, possible solution 1 [HB1, HB2], possible solution 2 [HB1, LB2], possible solution 3 [LB1, HB2], and possible solution 4 [LB1, LB2].

The optimization module then performs transactions on each possible solution in the solutions matrix. Specifically, the optimization module performs the same transaction that is defined by the associated composite object. For example, because the solutions matrix includes all possible solutions of the values of B1 and B2, each solution in the solutions matrix is tested against the composite object that is also associated with B1 and B2, namely, C1.

It should be appreciated that the transaction performed on each possible solution in the solutions matrix is the same transaction defined by composite object C1. For example, if composite object C1 is an object defining the difference between B1 and B2 values, the optimization module calculates the difference between the B1 and B2 values for each possible solution in the solutions matrix.

Figure 6:
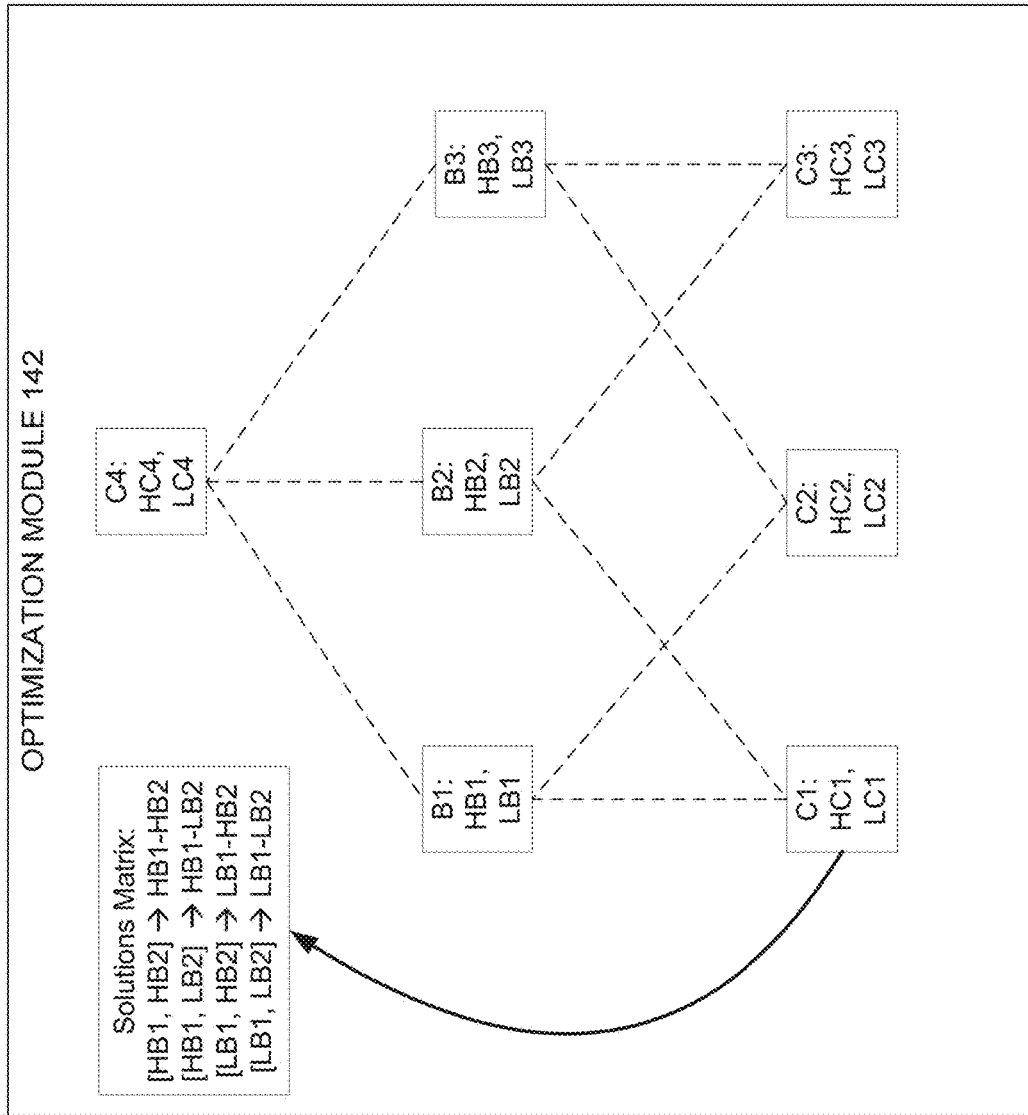
FIG. 6 depicts an example optimization module in accordance with the disclosed embodiments.

The optimization module accordingly performs the relevant transaction (using the associated composite object C1 as a guide) on each possible solution in the solutions matrix. In one embodiment, the optimization module stores the transaction results within the solutions matrix, as shown in FIG. 6.

Figure 7:
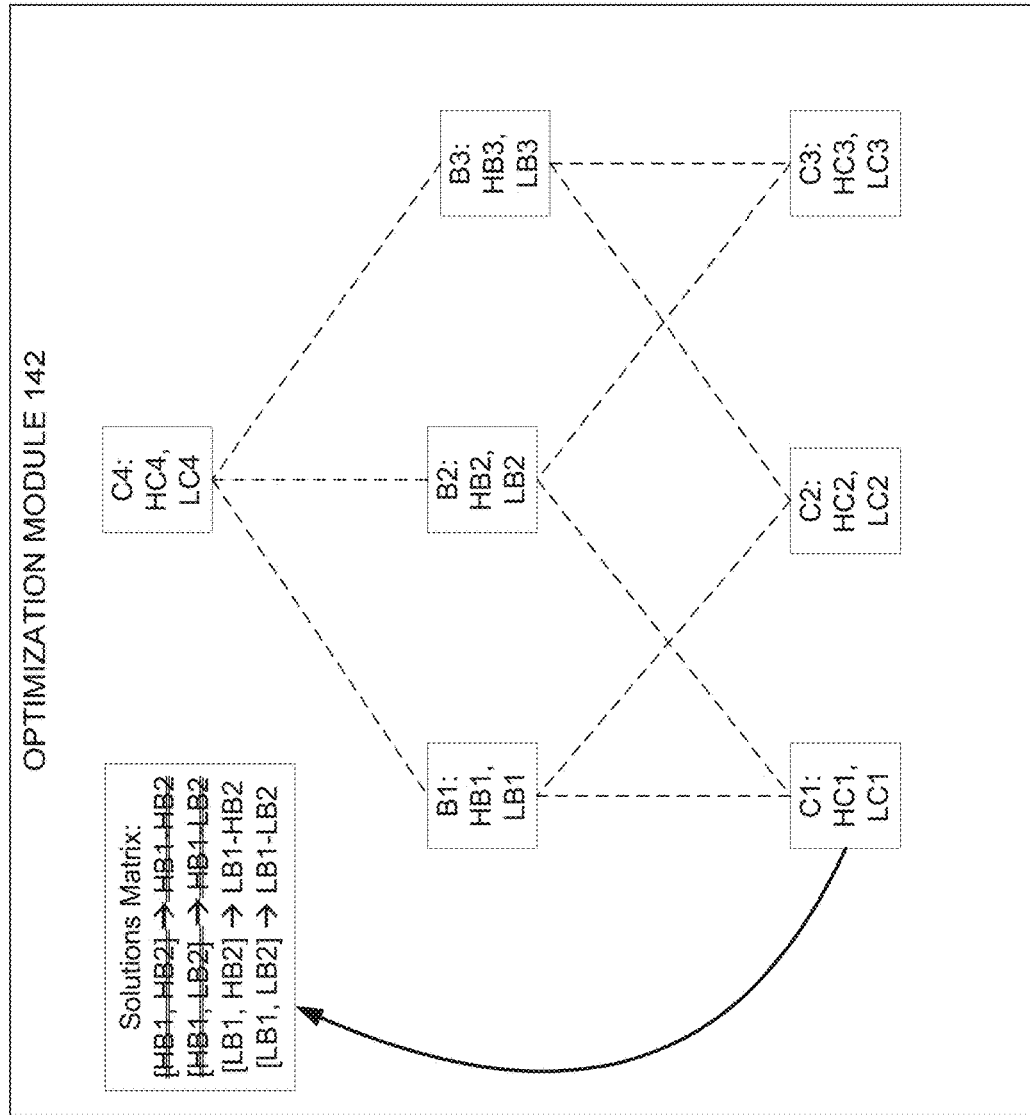
FIG. 7 depicts an example optimization module in accordance with the disclosed embodiments.

The optimization module then compares the solutions matrix transaction results to the received values for composite object C1. Any transaction result that does not meet or fall between the received values for composite object C1 is deemed to be an undesirable transaction result. The possible solution that let to such a transaction result is eliminated from the solutions matrix. For example, if optimization module determines that transaction results HB1-HB2 and HB1-LB2 are both outside of a range of values defined by and including HC1 and LC1, the optimization module eliminates those possible solutions from the solutions matrix, as shown in FIG. 7.

It should accordingly be appreciated that the optimization module eliminated possible B1, B2 solutions whose transaction results do not conform to or are not valid for the composite object associated with B1 and B2, namely, C1. As used herein, transaction results between values of B1 and B2 are considered to be valid for composite object C1 if the transaction results are the same as one of the possible values for C1 or fall within a range of values defined by the possible values for C1. It should also be appreciated that the elimination of [HB1, HB2] and [HB1, LB2] as possible solutions for B1 and B2 reduces the overall data set of possible solutions, making subsequent calculations and operations on the solutions matrix faster and more efficient.

Figure 8:
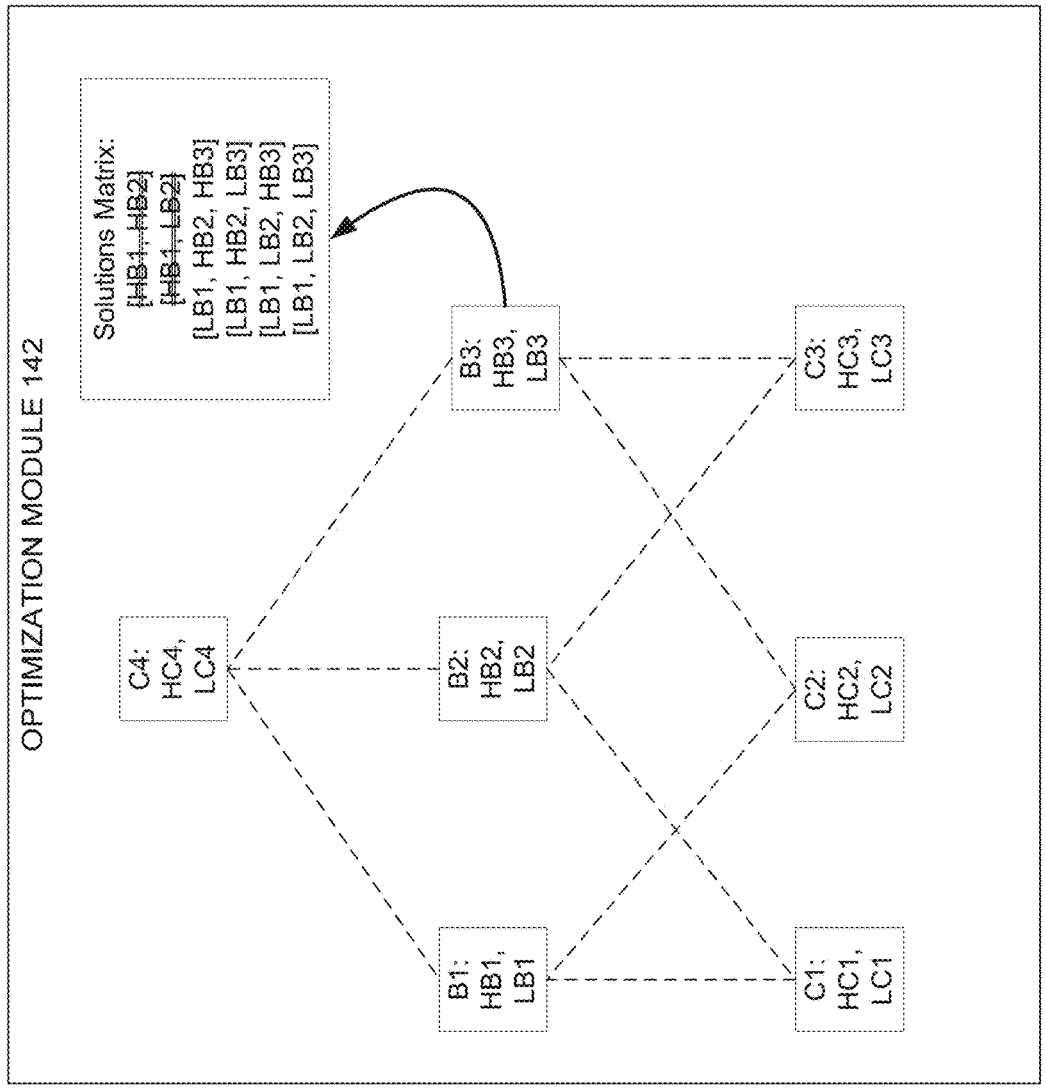
FIG. 8 depicts an example optimization module in accordance with the disclosed embodiments.

The optimization module then iteratively adds possible solutions to the current solution matrix, e.g., by considering the next base object B3, performs transactions between those solutions based on associated composite objects, and removes solutions whose transaction result is not valid for received values for the associated composite objects. Specifically, the optimization module updates the solutions matrix in light of the next base object B3, as shown in FIG. 8. [LB1, HB2] is permutated with each received value of B3, namely, HB3 and LB3. The possible solution of [LB1, HB2] is modified to [LB1, HB2, HB3] and [LB1, HB2, LB3] in the solutions matrix, as shown in FIG. 8. The possible solution of [LB1, LB2] is modified to [LB1, LB2, HB3] and [LB1, LB2, LB3] in the solutions matrix, as also shown in FIG. 8.

The optimization module then performs transactions on each possible combination of B1 and B3 values in the solutions matrix. Specifically, the optimization module performs the same transaction that is defined by the associated composite object. For example, because the solutions matrix includes all the current possible solutions of the values of B1 and B3, each solution in the solutions matrix is tested against the composite object that is also associated with B1 and B3, namely, C2. For example, if composite object C2 is an object defining the difference between B1 and B3 values, the optimization module calculates the difference between the B1 and B3 values for each possible solution in the solutions matrix.

Figure 9:
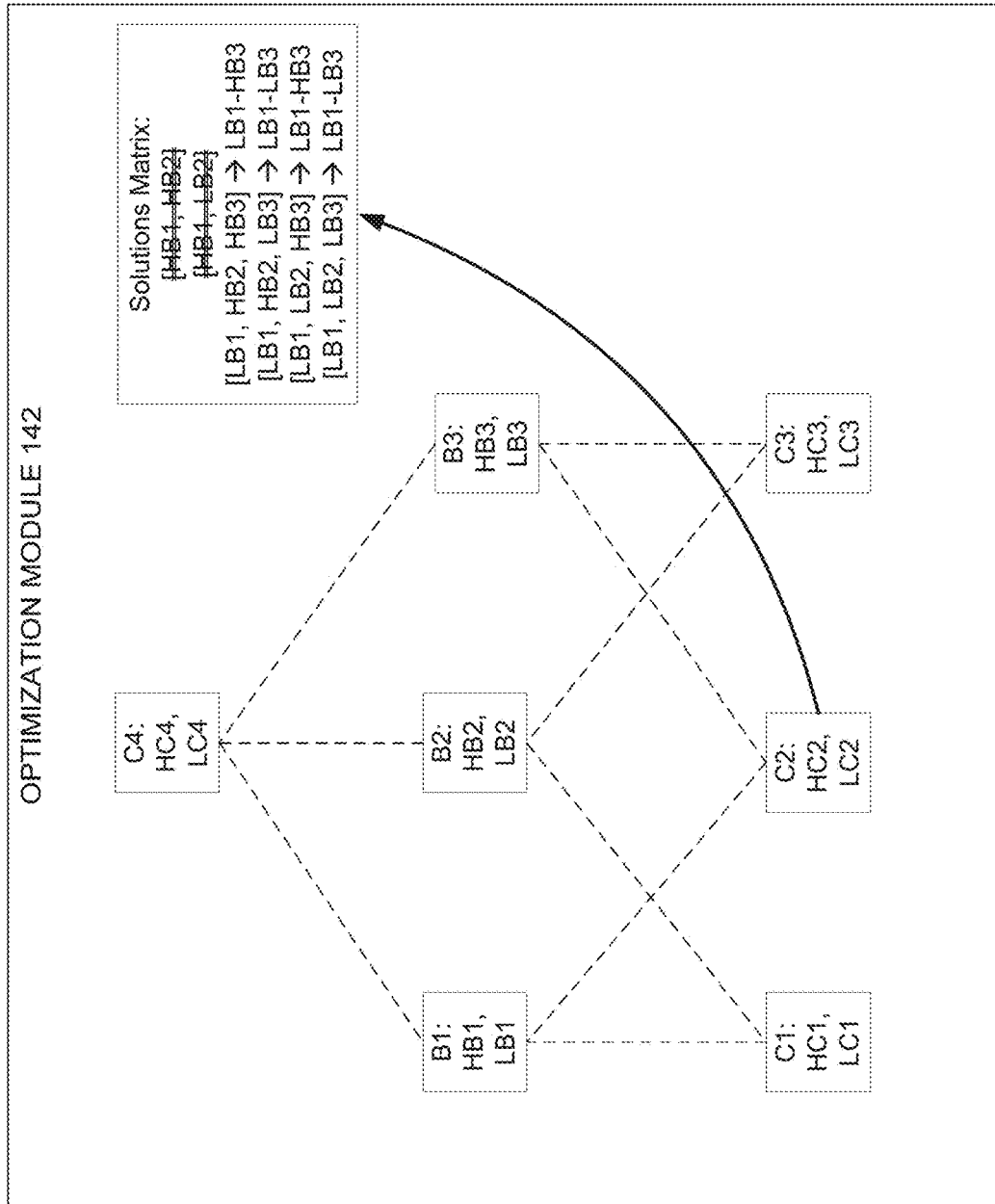
FIG. 9 depicts an example optimization module in accordance with the disclosed embodiments.

The optimization module accordingly performs the relevant transaction (using the associated composite object C2 as a guide) on each possible solution in the solutions matrix. In one embodiment, the optimization module stores the transaction results within the solutions matrix, as shown in FIG. 9.

It should be understood that some of the possible solutions in the solutions matrix may include the same values for B1 and B3. For example, possible solutions [LB1, HB2, HB3] and [LB1, LB2, HB3] share the same values for B1 and B3. The optimization module in one embodiment is configured to re-use values for a previously performed transaction, instead of repeating the transaction. For example, the optimization module performs the appropriate B1-B3 transaction for [LB1, HB2, HB3]. When the optimization module is processing [LB1, LB2, HB3], the optimization module is configured to re-use or copy the transaction results from the [LB1, HB2, HB3] processing.

Figure 10:
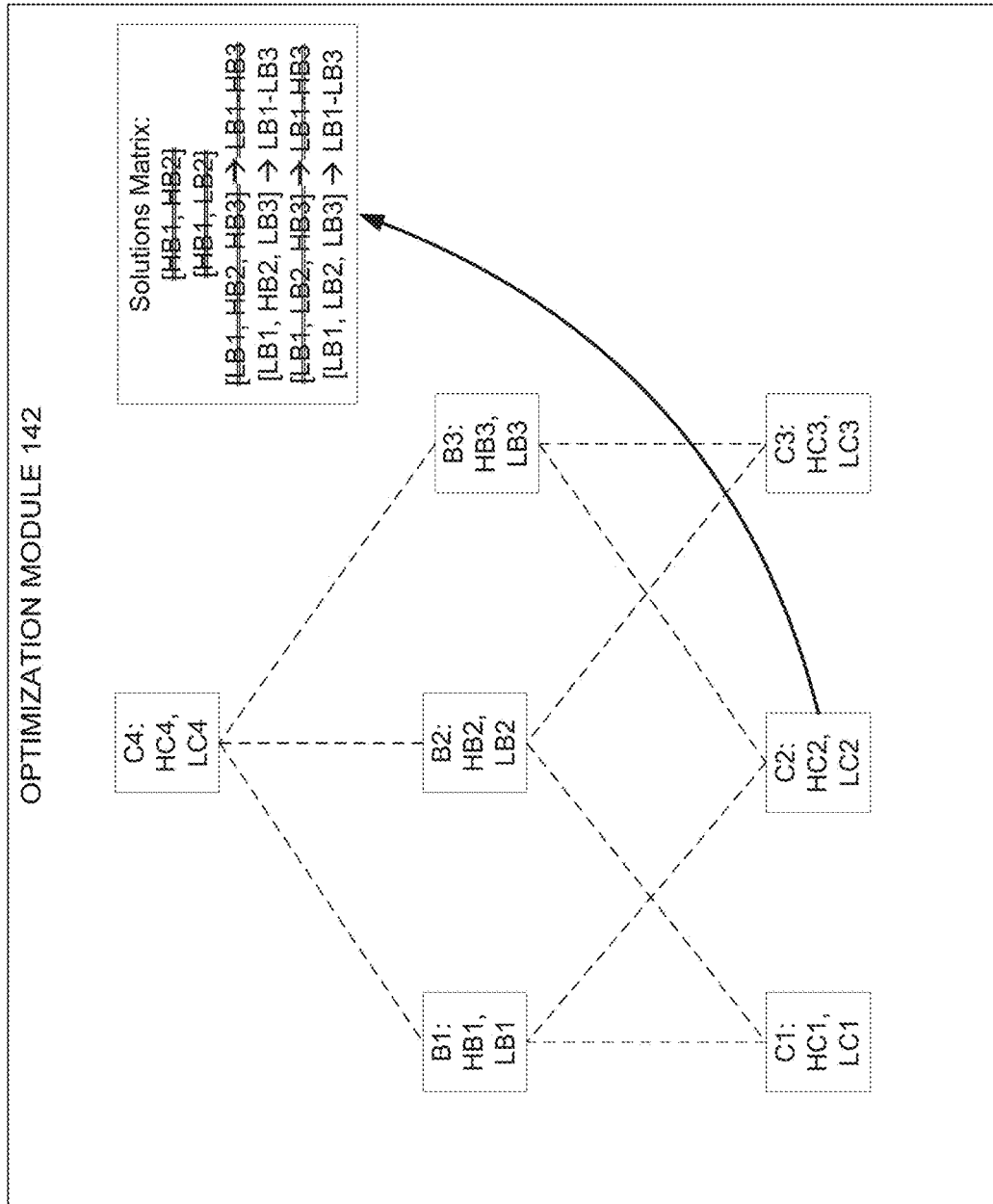
FIG. 10 depicts an example optimization module in accordance with the disclosed embodiments.

The optimization module then compares the solutions matrix transaction results to the received values for composite object C2. Any transaction result that does not meet or fall between the received values for composite object C2 is deemed to be an undesirable transaction result. The possible solution that let to such a transaction result is eliminated from the solutions matrix. For example, if optimization module determines that transaction result LB1-LB3 is outside of a range defined by and including HC2 and LC2, the optimization module eliminates this possible solution from the solutions matrix, as shown in FIG. 10. Because possible solutions [LB1, HB2, HB3] and [LB1, LB2, HB3] both share the transaction result LB1-LB3, the optimization module is configured to re-use the comparison of LB1-LB3 to the range defined by and including HC2 and LC2. As shown in FIG. 10, both [LB1, HB2, HB3] and [LB1, LB2, HB3] are eliminated from the solutions matrix due to the determination that LB1-LB3 is outside of a range defined by and including HC2 and LC2.

It should accordingly be appreciated that the optimization module eliminated possible solutions having B1, B3 values whose transaction results are not valid for the composite object associated with B1 and B3, namely, C2.

The optimization module continues iteratively processing the effects of multiple base objects analyzed simultaneously. The optimization module next considers the combination of B2 and B3. Because B2 values were added to the solutions matrix when the optimization module was analyzing the combination of B1 and B2, the optimization module does not need to update the solutions matrix. Instead, the optimization module can directly begin performing transactions between the B2 and B3 values. It should be appreciated, however, that if the optimization module were considering a fourth base object, e.g., an example base object B4, the optimization module would update the solutions matrix by including possible solutions due to the inclusion of a new base object.

Figure 11:
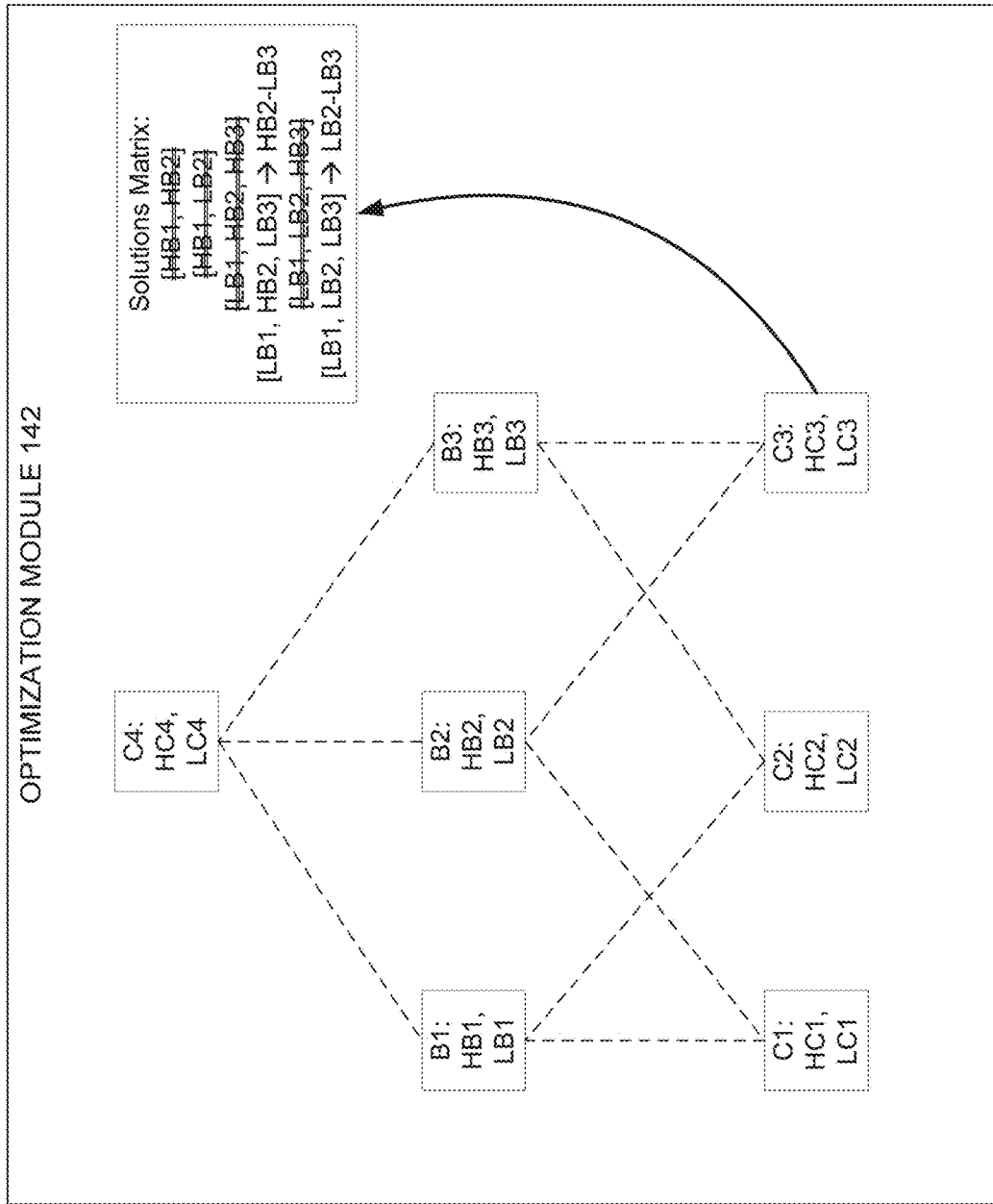
FIG. 11 depicts an example optimization module in accordance with the disclosed embodiments.

As shown in FIG. 11, the optimization module performs transactions on each possible combination of B2 and B3 values in the solutions matrix. Specifically, the optimization module performs the same transaction that is defined by the associated composite object. For example, because the solutions matrix includes all the current possible solutions of the values of B2 and B3, each solution in the solutions matrix is tested against the composite object that is also associated with B2 and B3, namely, C3. For example, if composite object C3 is an object defining the difference between B2 and B3 values, the optimization module calculates the difference between the B2 and B3 values for each possible solution in the solutions matrix.

The optimization module accordingly performs the relevant transaction (using the associated composite object C3 as a guide) on each possible solution in the solutions matrix. In one embodiment, the optimization module stores the transaction results within the solutions matrix, as shown in FIG. 11.

The optimization module then compares the solutions matrix transaction results to the received values for composite object C3. Any transaction result that does not meet or fall between the received values for composite object C3 is deemed to be an undesirable transaction result. The possible solution that let to such a transaction result is eliminated from the solutions matrix. For example, if optimization module determines that both transaction results HB2-LB3 and LB2-LB3 are within a range defined by and including HC3 and LC3, the optimization module does not eliminate any of the possible solutions.

It should accordingly be appreciated that the optimization module did not eliminate any possible solutions in the current iteration because all of the possible solutions had B2, B3 values whose transaction results were valid for the composite object associated with B2 and B3, namely, C3.

The optimization module then iteratively processes and analyzes combinations of all three base objects. The optimization module does not need to update the solutions matrix because the optimization module is not adding a new base object into consideration. Instead, the optimization module is going to consider the combination of B1, B2 and B3, each of which have previously been added to the solutions matrix. The optimization module can thus directly begin performing transactions between the B1, B2 and B3 values.

Figure 12:
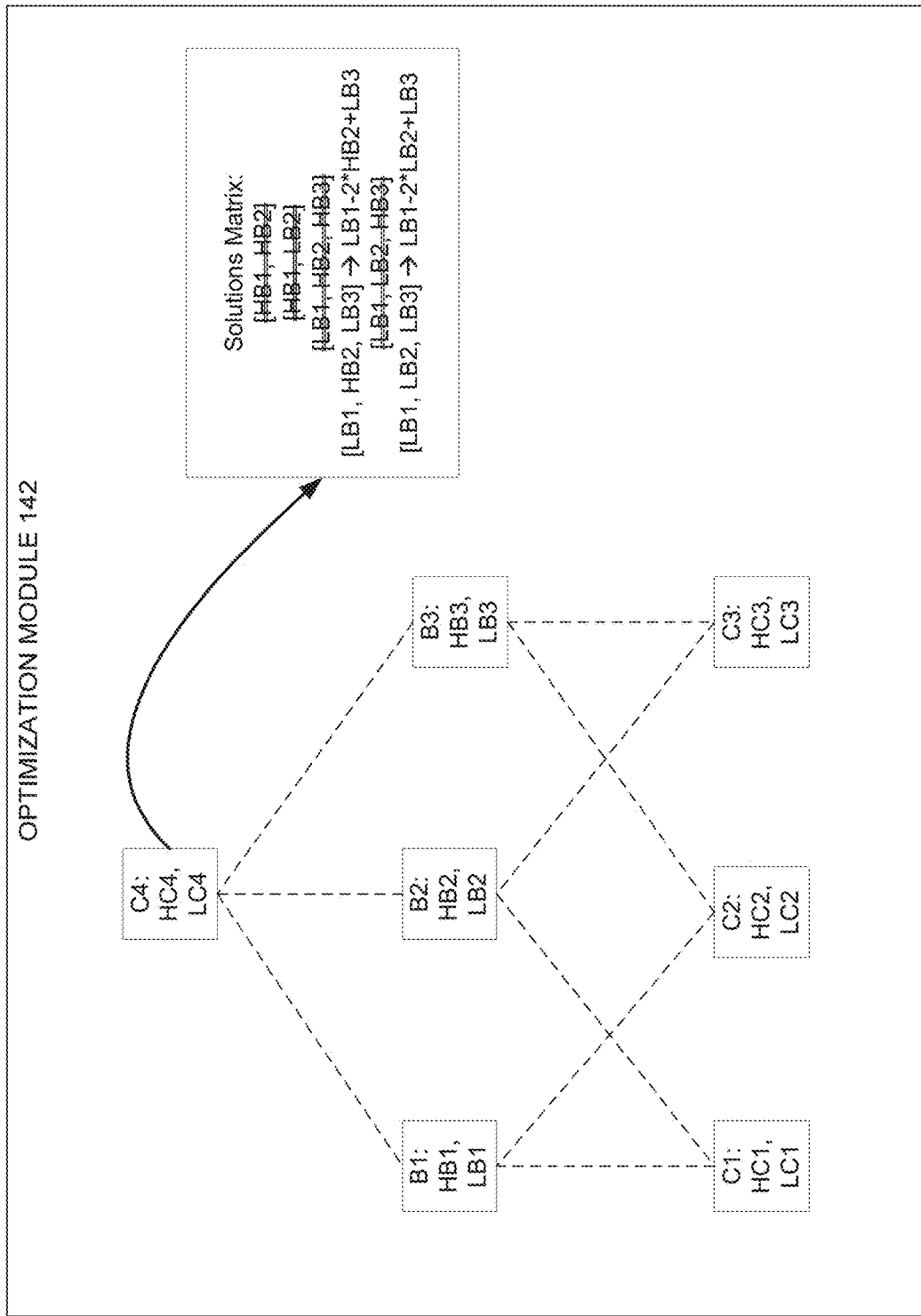
FIG. 12 depicts an example optimization module in accordance with the disclosed embodiments.

As shown in FIG. 12, the optimization module performs transactions on each possible combination of B1, B2 and B3 values in the solutions matrix. Specifically, the optimization module performs the same transaction that is defined by the associated composite object. For example, each solution in the solutions matrix is tested against the composite object that is also associated with B1, B2 and B3, namely, C4. For example, if composite object C4 is an object defining a net value between B1, B2 and B3 values, such as for example, B1−2*B2+B3, the optimization module performs this same calculation between the B1, B2 and B3 values for each possible solution in the solutions matrix.

The optimization module accordingly performs the relevant transaction (using the associated composite object C4 as a guide) on each possible solution in the solutions matrix. In one embodiment, the optimization module stores the transaction results within the solutions matrix, as shown in FIG. 12.

Figure 13:
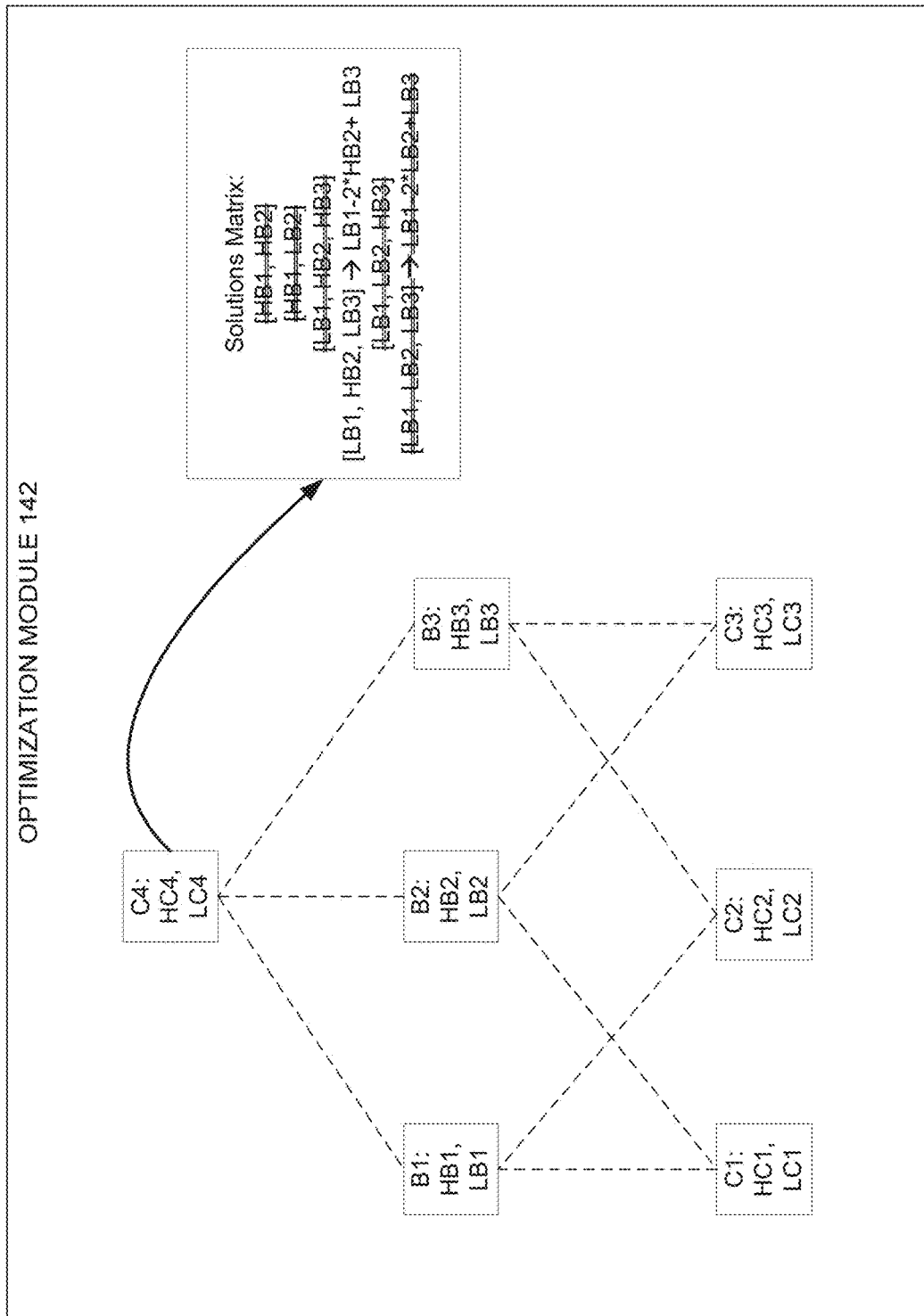
FIG. 13 depicts an example optimization module in accordance with the disclosed embodiments.

The optimization module then compares the solutions matrix transaction results to the received values for composite object C4. Any transaction result that does not meet or fall between the received values for composite object C4 is deemed to be an undesirable transaction result. The possible solution that let to such a transaction result is eliminated from the solutions matrix. For example, if optimization module determines that transaction result LB1−2*LB2+LB3 is outside of a range defined by and including HC4 and LC4, the optimization module eliminates this possible solution from the solutions matrix, as shown in FIG. 13.

Figure 14:
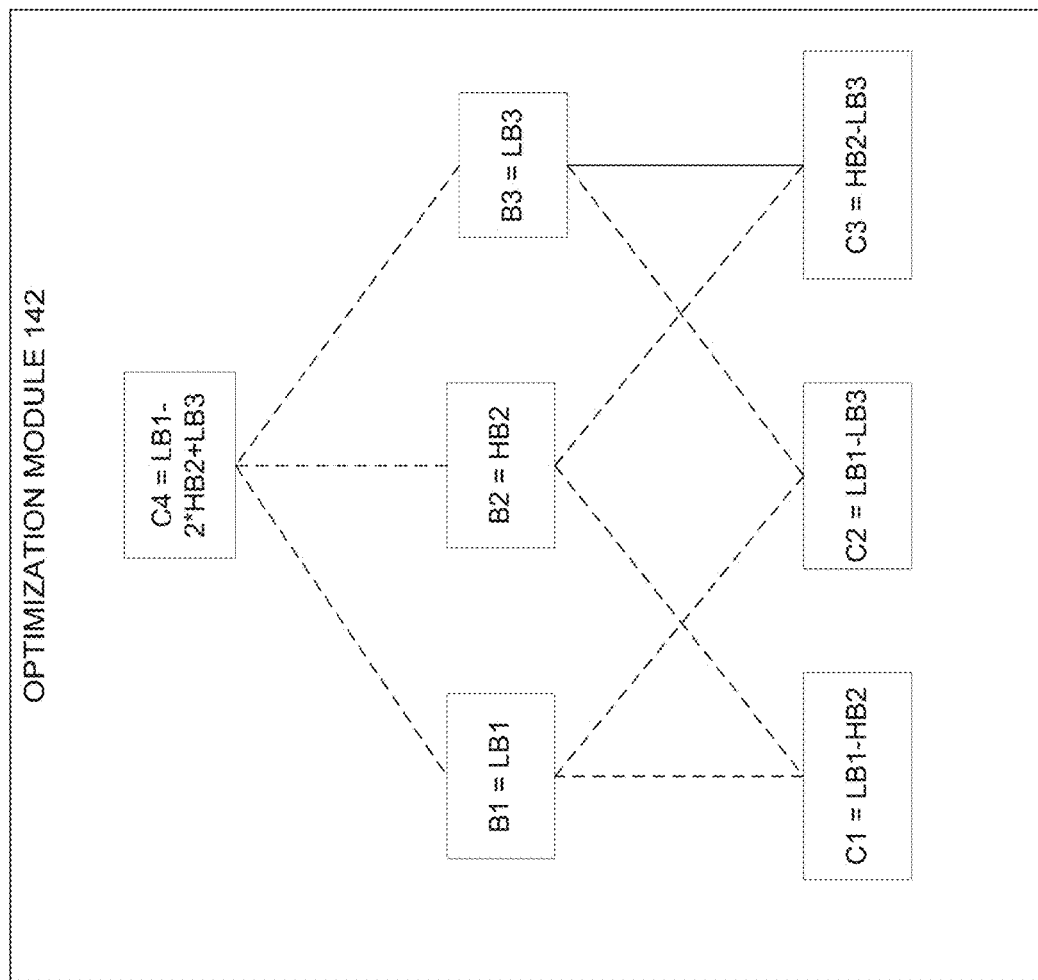
FIG. 14 depicts an example optimization module in accordance with the disclosed embodiments.

This iterative step leaves only one solution in the solutions matrix, namely, [LB1, HB2, LB3]. The optimization module accordingly selects [LB1, HB2, LB3] as values for base objects B1, B2 and B3, as shown in FIG. 14. The optimization module may assign the selected values in the registers and memory associated with optimization module 142 in accordance with the example data structure illustrated in FIG. 14.

Although each base and composite object in the examples of FIGS. 3 to 14 received two possible values, e.g., a high value and a low value, each object may receive more than two values. Or, the computing system might calculate additional values that could be possible values for objects. For example, in some computing environments, the received values would be understood to define a range, and the computing system may generate additional values as possible object values between the received values. For example, the computing system may generate a median value between the received high and low values. In one embodiment, the full list of high, median, and low values may be considered to be the received values.

It should be appreciated that in FIGS. 5 to 13, the illustrated base and composite objects have been received by the optimization module, e.g., sent from users of the exchange system or from trading computers or collected from data streams, whereas the solutions matrix and the associated transaction results have been generated by the exchange computer system including the optimization module. Thus, the optimization module generates a solutions matrix of possible combinations of received values of the base objects, performs transactions, and stores transaction results, and uses the received values of the composite objects to eliminate possible combinations of received values of the base objects.

In one embodiment, the order of processing base objects affects the final solutions assigned to the objects. In the examples associated with FIGS. 3 to 14, the optimization module processes and analyzes the combination of base objects B1 and B2 associated with composite object C1 first, then processes and analyzes the combination of base objects B1 and B3 associated with composite object C2 second, then processes and analyzes the combination of base objects B2 and B3 associated with composite object C3, and then processes and analyzes the combination of base objects B1, B2 and B3 associated with composite object C4. Thus, the order of events reflects, in one embodiment, the hierarchical prioritization of relationships. A user may reconfigure the optimization module to reflect a different priority. For example, a user or administrator of the exchange system may consider conforming to the relationship defined by composite object C3 to be more important than conforming to the relationship defined by composite object C2. The user or administrator may accordingly configure the optimization module to process and analyze C3 before processing and analyzing C2, which would alter the final solution for values assigned to the base objects. Thus, the optimization module may be configurable to analyze different combinations of base objects in different orders, which changes the possible solutions that survive within the solutions matrix in each iteration of the described process.

Figure 15:
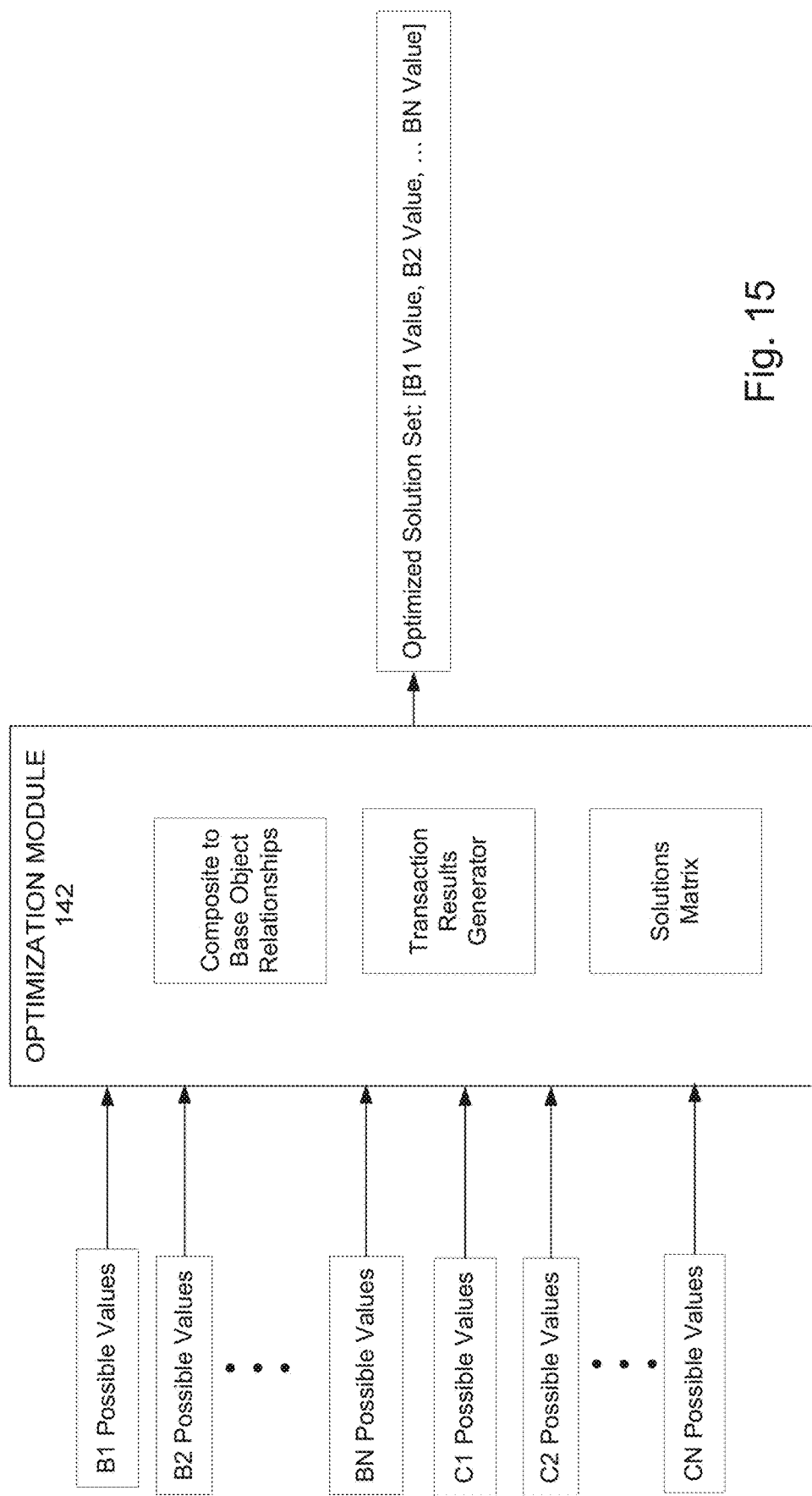
FIG. 15 illustrates an example input/output block diagram illustrating an example optimization module in accordance with the disclosed embodiments.

FIG. 15 illustrates an example input/output block diagram illustrating an example optimization module 142 that accepts possible values for base objects B1, B2, . . . BN and composite objects C1, C2, . . . CN. In one embodiment, the optimization module stores information about the relationships between the various base and composite objects. Or, alternatively, the optimization module may extract relationship information by analyzing each composite object. As discussed herein, composite objects may define relationships between multiple objects, e.g., between two base objects, or between two composite objects, or a base object and a composite object. In one embodiment, a composite object may be represented by an equation, such as equation 1.

The optimization module applies the extracted relationship to the received values of the objects. For example, the optimization module may have stored therein, or may have extracted, a relationship defining a composite object. The optimization module then performs transactions that apply the stored or extracted relationships upon the values of the corresponding base objects that are the subject of the relationships, as discussed herein. The optimization module may store the transaction results in a solutions matrix and compare the results to the received values for the corresponding composite objects, as discussed herein. The optimization module iteratively processes the composite object relationships in pre-defined order. The optimization module outputs the selected base object value for each base object. The optimization module may output an optimized solution including a value for B1 from one of the received possible values for B1, a value for B2 from one of the received possible values for B2, and so on, including a value for BN from one of the received possible values for BN.

It should be appreciated that although the optimization module utilizes information from the composite objects, the optimization module in one embodiment only outputs values for the base objects. In one embodiment, the optimization module may output values for base and composite objects, using information extracted from other composite objects.

Figure 16:
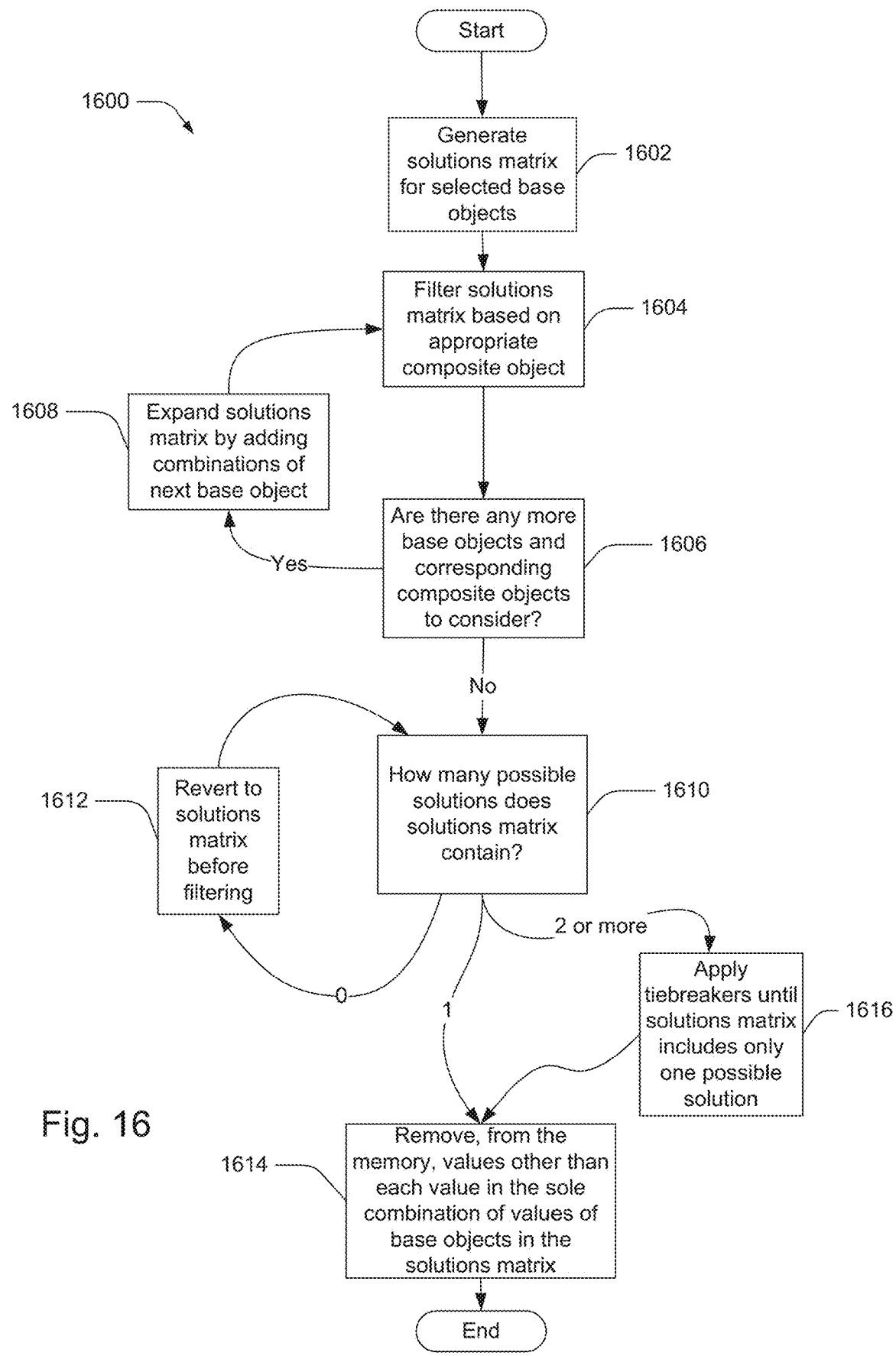
FIG. 16 depicts an example flowchart for implementing an optimization system in accordance with to the disclosed embodiments.

FIG. 16 illustrates an example flowchart indicating a method of implementing the disclosed optimization system, as may be implemented with computer devices and computer networks, such as those described with respect to FIGS. 1 and 2. Embodiments may involve all, more or fewer actions indicated by the blocks of FIG. 16. The actions may be performed in the order or sequence shown or in a different sequence.

In one embodiment, the steps of FIG. 16 may be carried out by a computer implementing optimization module 142. As discussed herein, in one embodiment, the optimization module begins by analyzing and processing a pair of base objects, where each base object may have one or more than one possible value. The optimization module generates a solutions matrix that includes each possible solution for the base objects, as shown in block 1602. In other words, the solutions matrix includes each possible combination of values for the pair of base objects under consideration.

The optimization module then eliminates solutions from the solutions matrix based on a composite object related to the base objects under consideration, as shown in block 1604. In particular, as discussed herein, the optimization module performs a transaction defined by the related composite object, compares the transaction results with all possible values of the related composite object, and eliminates possible solutions from the solutions matrix whose transaction result falls outside of a range defined by received values for, and thus are not valid for, the related composite object.

The optimization module then determines whether the environment includes any other base objects not yet considered, as shown in block 1606. If the environment, e.g., the optimization module, includes other base objects not yet considered, the optimization module selects the next base object to analyze and process. In one embodiment, for each base object, the system includes at least one composite object defining a relationship involving each base object. The system may include multiple composite objects that define different relationships for each base object.

Upon determining that the optimization module includes more base and composite objects to consider, the optimization module expands the solutions matrix by considering permutations of the possible solutions in the solutions matrix with the received values of a next base object, as shown in block 1608. Once the solutions matrix is expanded to consider the next base object, the optimization module again filters the solutions based on the composite object related to a newly available combination of object values due to the addition of the newly considered base object, as shown in block 1604.

If the optimization module determines that there are no more base and composite objects to consider in step 1606, the optimization module then checks how many possible solutions the solutions matrix contains, as shown in block 1610.

If the optimization module determines that the solutions matrix contains no possible solutions because they were filtered out or eliminated at step 1604, the optimization module reverts the solutions matrix to the version of the solutions matrix before the filtering at block 1604, as shown in block 1612. The optimization module may for example be capable of version control and storage, so that the optimization module can revert any of its components, such as the solutions matrix, to a previous version. The optimization module then again checks whether there are more base and composite objects to consider in block 1610.

If the optimization module determines that the solutions matrix contains one possible solution of values for all the considered base objects, the optimization module removes all the other values for the base objects, as shown in block 1614. The optimization module then selects the values from the sole possible solution in the solutions matrix as the values for each base object. Process 1600 then ends.

If the optimization module determines that the solutions matrix contains two or more possible solutions, the optimization module applies pre-configured tiebreakers, as shown in block 1616. It should be appreciated that there are no more base or composite objects to apply or consider to expand and filter the solutions matrix by the time the optimization module is processing block 1616. An example tiebreaker may compare the values in the possible solutions with historical values for the corresponding base objects. Moreover, the difference from historical values for the various base objects may be weighted.

For example, if process 1600 results in two possible solutions, where each possible solution includes values for three base objects, the optimization module may calculate the deviation or absolute difference of each value from a historical value, such as a volume weighted average value, for the corresponding base object, and sum the total deviations for the three objects. The solution whose values deviate the least from the historical value for each object is selected. In one embodiment, the deviation for some of the base objects may be weighted differently than the deviation for other base objects.

In one embodiment, the optimization module may include more than one tiebreaker, so that if a first tiebreaker does not result in a single solution, a second tiebreaker is applied. If, after all tiebreakers are applied, the solutions matrix still includes more than one possible solution, the optimization module may select a possible solution at random or based on alphabetical order.

The optimization module, in one embodiment, accordingly continues the iterative process of generating possible solutions for the solutions matrix and filtering or eliminating possible solutions from the solutions matrix based on the relationships defined by composite objects until all of the objects are processed and analyzed and until one solution remains in the solutions matrix. If all of the objects are processed and analyzed and the solutions matrix includes more than one possible solution, the optimization module applies tiebreakers between the remaining solutions, such as determining which solutions deviate from volume weighted average values. In one embodiment, the deviation differences may be weighted differently for different base objects.

The optimization module may be included in or applied to an exchange computer system. In one embodiment, an exchange computer system may convert contracts or legs to base objects and may convert spread instruments to composite objects.

When applied to a financial exchange computer system, the embodiments described herein may utilize trade related electronic messages such as mass quote messages, individual order messages, modification messages, cancelation messages, etc., so as to enact trading activity in an electronic market. The trading entity and/or market participant may have one or multiple trading terminals associated with the session. Furthermore, the financial instruments may be financial derivative products. Derivative products may include futures contracts, options on futures contracts, futures contracts that are functions of or related to other futures contracts, swaps, swaptions, or other financial instruments that have their price related to or derived from an underlying product, security, commodity, equity, index, or interest rate product. In one embodiment, the orders are for options contracts that belong to a common option class. Orders may also be for baskets, quadrants, other combinations of financial instruments, etc. The option contracts may have a plurality of strike prices and/or comprise put and call contracts. A mass quote message may be received at an exchange. As used herein, an exchange 100 includes a place or system that receives and/or executes orders.

It should be appreciated that the disclosed embodiments may be applicable to other types of messages depending upon the implementation. Further, the messages may comprise one or more data packets, datagrams or other collection of data formatted, arranged configured and/or packaged in a particular one or more protocols, e.g., the FIX protocol, TCP/IP, Ethernet, etc., suitable for transmission via a network 214 as was described, such as the message format and/or protocols described in U.S. Pat. No. 7,831,491 and U.S. Patent Publication No. 2005/0096999 A1, both of which are incorporated by reference herein in their entireties and relied upon. Further, the disclosed message management system may be implemented using an open message standard implementation, such as FIX Binary, FIX/FAST, or by an exchange-provided API.

Traders trading on an exchange including, for example, exchange computer system 100, often desire to trade multiple financial instruments in combination. Each component of the combination may be called a leg. Traders can submit orders for individual legs or in some cases can submit a single order for multiple financial instruments in an exchange-defined combination. Such orders may be called a strategy order, a spread order, or a variety of other names.

A spread instrument may involve the simultaneous purchase of one security and sale of a related security, called legs, as a unit. The legs of a spread instrument may be options or futures contracts, or combinations of the two. Trades in spread instruments are executed to yield an overall net position whose value, called the spread, depends on the difference between the prices of the legs. Spread instruments may be traded in an attempt to profit from the widening or narrowing of the spread, rather than from movement in the prices of the legs directly. Spread instruments are either "bought" or "sold" depending on whether the trade will profit from the widening or narrowing of the spread, respectively. An exchange often supports trading of common spreads as a unit rather than as individual legs, thus ensuring simultaneous execution of the two legs, eliminating the execution risk of one leg executing but the other failing.

One example of a spread instrument is a calendar spread instrument. The legs of a calendar spread instrument differ in delivery date of the underlier. The leg with the earlier occurring delivery date is often referred to as the lead month contract. A leg with a later occurring delivery date is often referred to as a deferred month contract. Another example of a spread instrument is a butterfly spread instrument, which includes three legs having different delivery dates. The delivery dates of the legs may be equidistant to each other. The counterparty orders that are matched against such a combination order may be individual, "outright" orders or may be part of other combination orders.

In other words, an exchange may receive, and hold or let rest on the books, outright orders for individual contracts as well as outright orders for spreads associated with the individual contracts. An outright order (for either a contract or for a spread) may include an outright bid or an outright offer, although some outright orders may bundle many bids or offers into one message (often called a mass quote).

A spread is an order for the price difference between two contracts. This results in the trader holding a long and a short position in two or more related futures or options on futures contracts, with the objective of profiting from a change in the price relationship. A typical spread product includes multiple legs, each of which may include one or more underlying financial instruments. A butterfly spread product, for example, may include three legs. The first leg may consist of buying a first contract. The second leg may consist of selling two of a second contract. The third leg may consist of buying a third contract. The price of a butterfly spread product may be calculated as:

$$\text{Butterfly} = \text{Leg1} - 2 \times \text{Leg2} + \text{Leg3} \qquad \text{(equation 1)}$$

In the above equation, Leg1 equals the price of the first contract, Leg2 equals the price of the second contract and Leg3 equals the price of the third contract. Thus, a butterfly spread could be assembled from two inter-delivery spreads in opposite directions with the center delivery month common to both spreads.

A calendar spread, also called an intra-commodity spread, for futures is an order for the simultaneous purchase and sale of the same futures contract in different contract months (i.e., buying a September CME S&P 500® futures contract and selling a December CME S&P 500 futures contract).

A crush spread is an order, usually in the soybean futures market, for the simultaneous purchase of soybean futures and the sale of soybean meal and soybean oil futures to establish a processing margin. A crack spread is an order for a specific spread trade involving simultaneously buying and selling contracts in crude oil and one or more derivative products, typically gasoline and heating oil. Oil refineries may trade a crack spread to hedge the price risk of their operations, while speculators attempt to profit from a change in the oil/gasoline price differential.

A straddle is an order for the purchase or sale of an equal number of puts and calls, with the same strike price and expiration dates. A long straddle is a straddle in which a long position is taken in both a put and a call option. A short straddle is a straddle in which a short position is taken in both a put and a call option. A strangle is an order for the purchase of a put and a call, in which the options have the same expiration and the put strike is lower than the call strike, called a long strangle. A strangle may also be the sale of a put and a call, in which the options have the same expiration and the put strike is lower than the call strike, called a short strangle. A pack is an order for the simultaneous purchase or sale of an equally weighted, consecutive series of four futures contracts, quoted on an average net change basis from the previous day's settlement price. Packs provide a readily available, widely accepted method for executing multiple futures contracts with a single transaction. A bundle is an order for the simultaneous sale or purchase of one each of a series of consecutive futures contracts. Bundles provide a readily available, widely accepted method for executing multiple futures contracts with a single transaction.

Thus, an exchange may match outright orders, such as individual contracts or spread orders (which as discussed above could include multiple individual contracts). The exchange may also imply orders from outright orders. For example, exchange computer system 100 may derive, identify, and/or advertise, publish, display, or otherwise make available for trading orders based on outright orders.

For example, two different outright orders may be resting on the books or be available to trade or match. The orders may be resting because there are no outright orders that match the resting orders. Thus, each of the orders may wait or rest on the books until an appropriate outright counter-offer comes into the exchange or is placed by a user of the exchange. The orders may be for two different contracts that only differ in delivery dates. It should be appreciated that such orders could be represented as a calendar spread order. Instead of waiting for two appropriate outright orders to be placed that would match the two existing or resting orders, the exchange computer system may identify a hypothetical spread order that, if entered into the system as a tradable spread order, would allow the exchange computer system to match the two outright orders. The exchange may thus advertise or make available a spread order to users of the exchange system that, if matched with a tradable spread order, would allow the exchange to also match the two resting orders. Thus, the match engine is configured to detect that the two resting orders may be combined into an order in the spread instrument and accordingly creates an implied order.

In other words, the exchange's matching system may imply the counteroffer order by using multiple orders to create the counteroffer order. Examples of spreads include implied IN, implied OUT, 2nd- or multiple-generation, crack spreads, straddle, strangle, butterfly, and pack spreads. Implied IN spread orders are derived from existing outright orders in individual legs. Implied OUT outright orders are derived from a combination of an existing spread order and an existing outright order in one of the individual underlying legs. Implied orders can fill in gaps in the market and allow spreads and outright futures traders to trade in a product where there would otherwise have been little or no available bids and asks.

For example, implied IN spreads may be created from existing outright orders in individual contracts where an outright order in a spread can be matched with other outright orders in the spread or with a combination of orders in the legs of the spread. An implied OUT spread may be created from the combination of an existing outright order in a spread and an existing outright order in one of the individual underlying leg.

By linking the spread and outright markets, implied spread trading increases market liquidity. For example, a buy in one contract month and an offer in another contract month in the same futures contract can create an implied market in the corresponding calendar spread. An exchange may match an order for a spread product with another order for the spread product. Some existing exchanges attempt to match orders for spread products with multiple orders for legs of the spread products. With such systems, every spread product contract is broken down into a collection of legs and an attempt is made to match orders for the legs. Examples of implied spread trading includes those disclosed in U.S. Patent Publication No. 2005/0203826, entitled "Implied Spread Trading System," the entire disclosure of which is incorporated by reference herein and relied upon. Examples of implied markets include those disclosed in U.S. Pat. No. 7,039,610, entitled "Implied Market Trading System," the entire disclosure of which is incorporated by reference herein and relied upon.

As an intermediary to electronic trading transactions, the exchange bears a certain amount of risk in each transaction that takes place. To that end, the clearing house implements risk management mechanisms to protect the exchange. One or more of the modules of the exchange computer system 100 may be configured to determine settlement prices for constituent contracts, such as deferred month contracts, of spread instruments, such as for example, settlement module 140.

One or more of the above-described modules of the exchange computer system 100 may be used to gather or obtain data to support the settlement price determination, as well as a subsequent margin requirement determination. For example, the order book module 110 and/or the market data module 112 may be used to receive, access, or otherwise obtain market data, such as bid-offer values of orders currently on the order books. The trade database 108 may be used to receive, access, or otherwise obtain trade data indicative of the prices and volumes of trades that were recently executed in a number of markets. In some cases, transaction data (and/or bid/ask data) may be gathered or obtained from open outcry pits and/or other sources and incorporated into the trade and market data from the electronic trading system(s).

In some cases, the outright market for the deferred month or other constituent contract may not be sufficiently active to provide market data (e.g., bid-offer data) and/or trade data. Spread instruments involving such contracts may nonetheless be made available by the exchange. The market data from the spread instruments may then be used to determine a settlement price for the constituent contract. The settlement price may be determined, for example, through a boundary constraint-based technique based on the market data (e.g., bid-offer data) for the spread instrument, as described in U.S. Patent Publication No. 2015/0073962 entitled "Boundary Constraint-Based Settlement in Spread Markets" ("the '962 Publication"), the entire disclosure of which is incorporated by reference herein and relied upon. Settlement price determination techniques may be implemented to cover calendar month spread instruments having different deferred month contracts.

As discussed above, a calendar spread order may be associated with two contracts or legs, and a butterfly spread order may be associated with three contracts or legs. As discussed above, the exchange system may calculate a settlement price for a contract. It should be appreciated that if an exchange system calculates a settlement price for a contract, the calculated settlement price also affects calendar spread orders and butterfly spread orders that are associated with that contract.

The settlement price that is selected by the exchange for a contract may be a settlement price that falls in a range defined by and including the lowest offer and highest bid for that contract. In some instances, multiple combinations of settlement prices may fall into such a range defined by and including the lowest offer and highest bid for a contract. For example, when the boundary constraint-based procedure of the '962 Publication is implemented, there may be instances where multiple combinations reside between the top of book or best bid and the top of book or best ask of the outright contracts. In one embodiment, the optimization module evaluates each of the potential solutions against the calendar spread and the butterfly markets associated with the outright contracts to select an optimum settlement price so that all relevant price discovery is accounted for in the value determination.

For example, an exchange computer system may calculate settlement prices for two contracts for the same underlier that differ only in delivery date. In some cases, the computer system's settlement calculation process may result in more than one settlement price for an individual contract. Thus, the system would need to select one value as the final settlement value or price. Once a value is selected for or assigned to each contract, the exchange may calculate an implied spread value between the two settlement prices for the two contracts. Each set of outright contract prices may imply a corresponding spread value. For example, for each pair of possible settlement prices for two different contracts, the exchange can calculate an implied calendar spread value, where the two legs are the two different contracts. Similarly, for three possible settlement prices for three different contracts, the exchange can calculate an implied butterfly spread value, where the three legs are the three different contracts. Thus, multiple prices may be possible values for an individual contract, and multiple contracts (that differ only in delivery dates) may make up a spread instrument.

For example, the implied spread values derived from two outright contracts can be tested against the tradable market in the spread instrument itself to determine which settlement prices for the underlying contracts would be valid for both the underlying contract market as well as the market in the tradable spread instrument.

Thus, the exchange may attempt to organize the values of the contracts so that if given a choice between multiple values for the contracts, the exchange is able to efficiently determine an optimum value for multiple contracts. However, this can require an exceedingly high amount of processing. For example, the exchange system's computers would need to calculate and keep track of data associated with all of the possible settlement prices for each contract, calculate an implied calendar spread value for each pair of possible settlement prices between two contracts, calculate an implied butterfly spread value for each triplet permutation of possible settlement prices between three contracts, and compare the calculated implied spread values (both calendar and butterfly spread values) against the tradable spread (both calendar and butterfly spread) instrument to determine which settlement prices should be selected. Such calculations are computationally expensive and may require too many computing resources to justify any benefits of selecting an optimum settlement price, such as price discovery and increased transparency. However, if the computations can be performed efficiently, e.g., quickly or in a short amount of time, the increase in computing time and costs may be justified by the overall benefits, and the exchange may experience a better assessment of risk due to the more accurate valuations. Thus, it would be beneficial to efficiently compute and select the optimum prices or values for each contract involved.

For example, a product may include several quarterly contracts that differ only in delivery date. For example, a Eurodollar futures contract offered by the CME may include forty quarterly contracts, e.g., March, June, September, and December, for ten years, e.g., the next ten years, e.g., 2016 to 2026. Each contract is a Eurodollar futures contract that has a delivery date of one of March, June, September, or December in one of ten years. The exchange may receive outright orders for any one of the forty contracts. Each of these futures contracts may be represented as a base object in the exchange computing system or environment.

The exchange may also receive orders for calendar spread instruments between any two of the forty contracts. The calendar spread orders may be represented as composite objects in the exchange computing system or environment.

In one embodiment, based on historical market data, and to reduce the number of permutations the exchange must monitor, the exchange may limit consideration to only certain spread instruments. The exchange may additionally or alternatively expand consideration to a wider set of spread instruments to include additional information that becomes relevant.

In one embodiment, based on historical market data, and to reduce the number of permutations the exchange must monitor, the exchange may limit calendar spread trading to 3-month calendar spread contracts (e.g., March-June 2016 calendar spread contracts), 6-month calendar spread contracts (e.g., March-September 2016 calendar spread contracts), 9-month calendar spread contracts (e.g., March-December 2016 calendar spread contracts) and 12-month calendar spread contracts (e.g., March 2016-March 2017 calendar spread contracts).

The exchange may also receive outright orders for butterfly spread orders between any three of the forty contracts. The butterfly spread orders may likewise be represented as composite objects in the exchange computing system or environment. In one embodiment, based on historical market data, and to reduce the number of permutations the exchange must monitor, the exchange may limit butterfly spread trading to 3-month butterfly spread contracts (e.g., March-June 2016 butterfly spread contracts) and 12-month butterfly spread contracts (e.g., March 2016-March 2017 butterfly spread contracts). It should be appreciated that the exchange calculates implied contract and spread values for contracts and spreads offered or traded on the exchange.

Thus, the exchange offers multiple contract or outright instruments that differ only in delivery dates, e.g., 40 Eurodollar contracts that are identical except for delivery dates, calendar spread instruments for a variety of pairs of the contracts, and butterfly spreads for a variety of triplets of the contracts. In addition, each contract or outright instrument, calendar spread instrument, and butterfly spread instrument may have multiple possible values, or prices that are valid for the market for that respective instrument. In one embodiment, each instrument offered can have at least two possible values that are valid for the respective instrument, namely, the tradable bid and the tradable ask. When multiple solutions are valid for each of the various instruments, the disclosed embodiments may be implemented to efficiently determine which of the multiple possible values is to be selected for the various outright contracts.

The disclosed settlement system may test implied calendar and butterfly spread values associated with possible price solutions, which are based on outright contracts, against tradable calendar and butterfly spread instrument markets, and eliminate possible price solutions based on the test. Eliminating price solutions from the set of possible price solutions reduces overall computing load on a settlement module of an exchange system and allows the exchange system to test related instrument relationships without an unnecessary or unjustifiable computational delay.

For example, a financial instrument may include several contracts, each having an outright market bid and offer. The contracts may be quoted in price increments called ticks. The bid and offer may be separated by multiple, e.g., three, ticks. Any of the ticks that are between the market bid and offer, including the bid and offer, may be valid settlement prices for the contract. Any of these ticks may thus be selected by the exchange as a settlement price for the contract. For example, a contract having a 45 bid and a 50-offer quoted in 1-unit increments, or ticks, could settle at 45, 46, 47, 48, 49 or 50 without violating the market. Thus, the exchange could select to settle the price for that contract at any of these prices, and each of these would be considered valid, as that term is used herein. Or, the bid and offer may be exactly one tick apart, meaning that the exchange could select either the bid or the offer as the settlement price and have selected valid prices for the contract, but there are no ticks between the bid and the offer that can be selected.

Settlement prices selected for two related contracts, e.g., December 2015 and March 2016 Eurodollar contracts, may or may not be valid for the tradable Eurodollar calendar spread instrument between December 2015 and March 2016, depending on the value of the tradable Eurodollar calendar spread instrument between December 2015 and March 2016. Similarly, settlement prices selected for three related contracts, e.g., December 2015, March 2016 and June 2016 Eurodollar contracts, may or may not be valid for a tradable butterfly spread instrument between December 2015, March 2016 and June 2016, depending on the value of the tradable butterfly spread instrument between December 2015, March 2016 and June 2016.

As discussed above, several prices or values may be considered to be valid for a tradable market. For example, for a given market, the tradable bid, the tradable offer, and any ticks between the tradable bid and offer may be possible values for that market. Thus, an exchange may be able to select any one of those values as the settlement price for a given contract, where each value is valid for the outright market for that contract.

For example, as shown in FIG. 17A, the real or outright market for Contract1 may include a bid, C1Bid, and an offer, C1Offer. Contract1 may be translated into a base object and processed by an optimization module. Each of C1Bid and C1Offer are values for the base object Contract1. The offer and the bid may be spaced far apart such that one tick exists between the offer and the bid, namely, C1Tick1. Thus, as also shown in FIG. 17A, there may be three possible values or settlement prices that are valid for the outright market for Contract1, namely, any one of Contract1 bid C1Bid, tick C1Tick1, and Contract1 offer C1Offer. It should be appreciated that while the tradable bid and offer are based on the outright market, the possible values are based on calculations performed by the exchange system processor.

Referring now to FIG. 17B, the real or outright market for Contract2 may include a bid, C2Bid, and an offer, C2Offer. The offer and the bid may be spaced close enough such that no ticks exist between the offer and the bid. Thus, as also shown in FIG. 17B, there may be two possible settlement prices that are valid for the outright market for Contract2, namely, either Contract2 bid C2Bid or Contract2 offer C2Offer. Again, while the tradable bid and offer are based on the outright market, the possible values are based on calculations performed by the exchange system processor.

When the Contract1 and the Contract2 solutions are considered together, there are $NUM_{contract1} \times NUM_{contract2}$ number of possible solutions that are valid for both Contract1 and Contract2, where $NUM_{contract1}$ represents the number of possible solutions for Contract1 and $NUM_{contract2}$ represents the number of possible solutions for Contract2. For example, there are 3×2=6 possible solutions, shown in FIG. 18A, that are valid for both Contract1 and Contract2. The possible solutions for the two contracts may be considered a first solution set or matrix, e.g., Equation 1 Matrix 1 shown in FIG. 18A. At this stage, any of the six solutions in Matrix 1 in FIG. 18A could be selected as the values or settlement prices for Contract1 and Contract2 by the settlement module because each solution is valid for both contracts. However, to assure that the prices are also valid for all associated spread instrument orders, the exchange computer system may consider what impact selecting each of the solutions would have on associated spread instruments. This process ensures better price discovery and system performance.

To consider the effect of each possible solution on the associated tradable spread instruments, the exchange computer system may perform transactions on the values stored in the matrix, or calculate an implied spread value for each of the possible solutions and add that data to the first matrix, as illustrated in FIG. 18B. The second column of Matrix 2 in FIG. 18B lists the possible solutions between Contract1 and Contract2, and the third column lists the implied spread between the respective contracts for each possible solution. For example, if the settlement module were to select C1Bid and C2Bid, i.e., Possible Solution 1, as the settlement prices for Contract1 and Contract2, respectively, the implied spread between the selected settlement prices would be C1Bid-C2Bid. The optimization module would then check whether C1Bid-C2Bid is valid for the market in the tradable spread instrument between Contract1 and Contract2. In one embodiment, the optimization module may discard those solutions from Matrix 1 whose implied spread value is not valid for the market in the associated tradable spread instrument between Contract1 and Contract2. This is especially advantageous because as the exchange computer system attempts to consider many different tradable calendar and butterfly spreads between many different contracts, the number of permutations and possible solutions can become so large that the exchange computer system experiences an unjustifiable delay. If however the optimization module can eliminate contract solutions that are not valid for the tradable spread instrument between those contracts, the exchange computer system only needs to perform the subsequent set of operations, described below, on a reduced data set, increasing computing efficiency while retaining only valid, useful solutions.

Thus, the optimization module may be said to test Matrix 1 against the market in the tradable spread instrument between Contract1 and Contract2. In other words, the possible solutions in Matrix 1 are filtered or reduced based on the tradable spread instrument between Contract1 and Contract2. The tradable spread instrument between Contract1 and Contract2 in turn may also have more than one possible value. CalendarSpread1-2 may be a calendar spread between Contract1 and Contract2. As shown in FIG. 19A, the tradable market for CalendarSpread1-2 may include a bid, CS1-2Bid, and an offer, CS1-2Offer. The offer and the bid may be spaced close enough such that no ticks exist between the offer and the bid. Thus, as also shown in FIG. 19A, there may be two possible settlement prices that are valid for the market for the calendar spread instrument between Contract1 and Contract2, namely, either CalendarSpread1-2 bid CS1-2Bid or CalendarSpread1-2 offer CS1-2Offer. The optimization module may test Matrix 1 against these possible settlement values. As shown in FIG. 19A, the fourth column of Matrix 1 includes data that can be used to identify the possible solutions whose implied calendar spread value is valid for the market for the calendar spread instrument between Contract1 and Contract2. It should be noted that when a filtering column, e.g., the fourth column of Matrix 1 in FIG. 19A is added to a matrix, the matrix is still referred to as Matrix 1. In one embodiment, a matrix may only be numbered differently when possible solutions, i.e., rows, are added or removed. When a column such as a filtering column is added to the matrix, it may still be identified as the same matrix. It should be appreciated that whether an implied calendar spread value between contracts in a possible solution is valid for the market for the calendar spread instrument between those contracts depends on the specific values of the outright contracts and spreads. In the example of FIG. 19A, the implied calendar spreads associated with Possible Solutions 3, 5 and 6 for Contract1 and Contract2 fall outside of or are not valid for the tradable calendar spread market for Contract1 and Contract2. The optimization module then eliminates Possible Solutions 3, 5, and 6 from the first matrix, resulting in a second matrix, Matrix 2, illustrated in FIG. 19B. Matrix 2 includes possible solutions 1, 2 and 4.

Thus, the optimization module filters the first matrix based on whether or not implied calendar spreads between possible contract prices are valid for the associated tradable calendar spread markets. In other words, the possible solutions that have associated implied spreads that are outside of the tradable calendar spread markets are eliminated from the first matrix, resulting in a second matrix. The first matrix of possible solutions has thus been decreased or reduced by filtering or testing the matrix against tradable spread data.

To summarize, the second matrix lists the possible solutions for two contracts, Contract1 and Contract2, where: (1) the values are valid for both outright contract markets, and (2) the implied calendar spread between the values for each solution is valid for the tradable calendar spread market for the same two contracts. In contrast, the values of the possible solutions in the first matrix can only be said to be valid for both outright contract markets. It should accordingly be appreciated to arrive at matrix 2 from matrix 1, the optimization module has eliminated the possible solutions for Contract1 and Contract2 whose implied calendar spread value is not valid for the market for the tradable calendar spread market between Contract1 and Contract2.

It should be appreciated that although FIG. 19B illustrates eliminated solutions 3, 5 and 6 as stricken through for exemplary purposes, a computer implementing the disclosed optimizing system would discard the eliminated solutions from its memory. An optimizing system including a processor that calculates settlement prices would be able to discard the eliminated data, resulting in less data that the system must store in memory and include in future calculations.

Once the matrix of possible solutions between two contracts has been filtered to eliminate certain solutions whose implied calendar spread value is not valid for the tradable calendar spread market between the two contracts, the optimization module may further process the remaining data in view of outright data for yet another contract. Again, this further processing, described below, is only performed on the reduced and filtered data set, resulting in an increase in processing speed and efficiency without eliminating any useful solutions.

For example, as shown in FIG. 20, the optimization module may consider another contract, Contract3. As also shown in FIG. 20, the real or outright market for Contract3 may include a bid value, C3Bid, and an offer value, C3Offer. The offer and the bid may be spaced close enough such that no ticks exist between the offer and the bid. Thus, as also shown in FIG. 20, there may be two possible settlement prices or values that are valid for the outright market for Contract3, namely, either Contract3 bid C3Bid or Contract3 offer C3Offer.

The optimization module then adds the Contract3 solutions to the Contract1 and Contract2 possible solutions in Matrix 2, resulting in Matrix 3 illustrated in FIG. 20. Unlike Matrix 2, which lists possible solutions between two contracts, Contract1 and Contract2, Matrix 3 lists possible solutions between three contracts, Contract1, Contract2 and Contract3. In particular, the second column of Matrix 3 lists possible values between Contract1, Contract2 and Contract3. Thus, when an additional contract is considered, the solutions that have not been eliminated, e.g., Solutions 1, 2, and 4, are modified to include the third contract. So, while Solutions 1, 2 and 4 in Matrix 2 only included 2 contracts, Solutions 1, 2 and 4 in Matrix 3 include 3 contracts but are nevertheless identified as Solutions 1, 2 and 4 to indicate their relationship.

Moreover, it should be noted Contract3 possible values are combined with the possible solutions in Matrix 2 to create additional permutations and possible solutions. However, solutions such as solutions 3, 5 and 6 which were eliminated in Matrix 2 are not considered in conjunction with Contract3's possible values. For the eliminated solutions, the optimization module does not need to even calculate the resulting combination of Contract1, Contract2 and Contract3, or the implied spread between Contract1 and Contract3. Thus, eliminating solutions that are not valid for the tradable calendar spread market between Contract1 and Contract2, as in Matrix 2, reduces the number of calculations performed when Contract3 data is considered. When the Matrix 2 solutions are considered in conjunction with the Contract3 possibilities, Possible Solutions 7, 8 and 9 are newly added to the overall possible solutions, resulting in Matrix 3.

The optimization module then calculates the implied spread between two of the three respective contracts for each possible solution, namely, the implied spread between Contract1 and Contract3 for possible solutions 1, 2, 4, 7, 8 and 9. This implied spread for each possible solution is listed in the third column of Matrix 3 in FIG. 20. Again, for previously eliminated solutions 3, 5 and 6, the optimization module does not even need to calculate the implied spread between Contract1 and Contract3. Thus, discarding solutions in earlier stages of the processing eliminates the overall calculations performed by and processing load of the settlement pricing system.

The optimization module then compares or tests the implied calendar spread between Contract1 and Contract3 for each possible solution in Matrix 3 against the possible values for the tradable calendar spread market between Contract1 and Contract3. CalendarSpread1-3 may be a calendar spread between Contract1 and Contract3. As shown in FIG. 21A, the tradable market for CalendarSpread1-3 may include a bid, CS1-3Bid, and an offer, CS1-3Offer. The offer and the bid may be spaced close enough such that no ticks exist between the offer and the bid. Thus, as also shown in FIG. 21A, there may be two possible settlement prices that are valid for the market in the tradable calendar spread instrument between Contract1 and Contract3, namely, either CalendarSpread1-3 bid CS1-3Bid or CalendarSpread1-3 offer CS1-3Offer. The optimization module may then filter or test the solutions in Matrix 3 against the possible values for the calendar spread between Contract1 and Contract3.

As shown in FIG. 21A, the fourth column of Matrix 3 includes data that can be used to identify the possible solutions whose implied calendar spread value between Contract1 and Contract3 values is valid for the market for the calendar spread instrument between Contract1 and Contract3. Again, because solutions 3, 5 and 6 were previously eliminated, the optimization module does not have to test the implied spread for these previously eliminated solutions against the tradable market for Contract1 and Contract3. It should be appreciated that whether an implied calendar spread value between contracts in a possible solution is valid for the tradable market for the calendar spread instrument between those contracts depends on the specific values of the contracts and spreads. In the example of FIG. 21A, the implied calendar spread values between Contract1 and Contract3 in Possible Solutions 4 and 8 are not valid for any of the possible values for the tradable calendar spread market between Contract1 and Contract3.

The optimization module eliminates Possible Solutions 4 and 8 from Matrix 3, resulting in Matrix 4 illustrated in FIG. 21B. As shown in FIG. 21B, Matrix 4 includes possible solutions 1, 2, 7 and 9. Matrix 4 lists the possible solutions for three contracts, Contract1, Contract2 and Contract3, where: (1) the values are valid for the outright markets for Contract1 and Contract2; (2) the implied calendar spread value between the values for each Contract1 and Contract2 possible solution is valid for the tradable calendar spread market for Contract1 and Contract2; and (3) the implied calendar spread value between the values for each Contract1 and Contract3 possible solution is valid for the tradable calendar spread market for Contract1 and Contract3.

The optimization module next compares or tests the implied calendar spread between Contract2 and Contract3 for each possible solution in Matrix 4 against the possible values for the tradable calendar spread between Contract2 and Contract3. CalendarSpread2-3 may be a calendar spread between Contract2 and Contract3. As shown in FIG. 22A, the tradable market for CalendarSpread2-3 may include a bid, CS2-3Bid, and an offer, CS2-3Offer. The offer and the bid may be spaced close enough such that no ticks exist between the offer and the bid. Thus, as also shown in FIG. 22A, there may be two possible settlement prices that are valid for the tradable market for the calendar spread between Contract2 and Contract3, namely, either CalendarSpread2-3 bid CS2-3Bid or CalendarSpread2-3 offer CS2-3Offer. The optimization module may then filter or test the solutions in Matrix 4 against the possible values for the calendar spread between Contract2 and Contract3.

As shown in FIG. 22A, the fourth column of Matrix 4 includes data that can be used to identify the possible solutions whose implied calendar spread value between Contract2 and Contract3 values is valid for the tradable market for the calendar spread between Contract2 and Contract3. Because solutions 3, 4, 5, 6 and 8 were previously eliminated, the optimization module does not have to test the implied calendar spread for these previously eliminated solutions against the tradable calendar spread market for Contract2 and Contract3. Again, it should be appreciated that whether an implied calendar spread value between contracts in a possible solution is valid for the tradable market for the calendar spread between those contracts depends on the specific values of the contracts and spreads. In the example of FIG. 22A, the implied calendar spreads between Contract2 and Contract3 in Possible Solutions 2 and 7 are not valid for any of the possible values for the tradable calendar spread market between Contract2 and Contract3.

The optimization module eliminates Possible Solutions 2 and 7, resulting in Matrix 5 illustrated in FIG. 22B. As shown in FIG. 22B, Matrix 5 includes solutions 1 and 9. Matrix 5 lists the possible solutions for three contracts, Contract1, Contract2 and Contract3, where: (1) the values are valid for the outright markets for Contract1 and Contract2; (2) the implied calendar spread value between the values for each Contract1 and Contract2 possible solution is valid for the tradable calendar spread market for Contract1 and Contract2; (3) the implied calendar spread value between the values for each Contract1 and Contract3 possible solution is valid for the tradable calendar spread market for Contract1 and Contract3; and (4) the implied calendar spread value between the values for each Contract2 and Contract3 possible solution is valid for the tradable calendar spread market for Contract2 and Contract3.

The optimization module next compares or tests the implied butterfly spread between Contract1, Contract2 and Contract3 for each possible solution in Matrix 5 against the possible values for the tradable butterfly spread instrument market between Contract1, Contract2 and Contract3. ButterflySpread1-2-3 may be a butterfly spread between Contract1, Contract2, and Contract3. As shown in FIG. 23A, the tradable market for ButterflySpread1-2-3 may include a bid, BS1-2-3Bid, and an offer, BS1-2-3Offer. The offer and the bid may be spaced close enough such that no ticks exist between the offer and the bid. Thus, as also shown in FIG. 23A, there may be two possible settlement prices that are valid for the tradable market for the butterfly spread between Contract1, Contract2, and Contract3, namely, either ButterflySpread1-2-3 bid BS1-2-3Bid or ButterflySpread1-2-3 offer BS1-2-3Offer. The optimization module may then filter or test the solutions in Matrix 5 against the possible values for the butterfly spread between Contract1, Contract2 and Contract3.

As shown in FIG. 23A, the fourth column of Matrix 5 includes data that can be used to identify the possible solutions whose implied butterfly spread value between Contract1, Contract2 and Contract3 values is valid for the tradable market for the butterfly spread between Contract1, Contract2 and Contract3. Because solutions 2 through 8 were previously eliminated, the optimization module does not have to test the implied butterfly spread for these previously eliminated solutions against the tradable butterfly spread market for Contract1, Contract2, and Contract3. It should be appreciated that whether an implied butterfly spread value between contracts in a possible solution is valid for the tradable market for the butterfly spread between those contracts depends on the specific values of the contracts and spreads. In the example of FIG. 23A, the implied butterfly spread between Contract1, Contract2, and Contract3 in Possible Solution 1 is not valid for any of the possible values for the tradable butterfly spread market between Contract1, Contract2, and Contract3.

The optimization module eliminates Solution 1, resulting in Matrix 6 illustrated in FIG. 23B. As shown in FIG. 23B, Matrix 6 only includes solution 9. Matrix 6 lists the only possible solution, Solution 9, for three contracts, Contract1, Contract2 and Contract3, where: (1) the values are valid for the outright markets for Contract1 and Contract2; (2) the implied calendar spread value between the values for Contract1 and Contract2 is valid for the tradable calendar spread market for Contract1 and Contract2; (3) the implied calendar spread value between the values for Contract1 and Contract3 is valid for the tradable calendar spread market for Contract1 and Contract3; (4) the implied calendar spread value between the values for Contract2 and Contract3 is valid for the tradable calendar spread market for Contract2 and Contract3; and (5) the implied butterfly spread value between the values for Contract1, Contract2 and Contract3 is valid for the tradable butterfly spread market for Contract1, Contract2 and Contract3.

FIG. 23C illustrates the final solution set, or Matrix 6, without the eliminated solutions. As noted above, a computer implementing the disclosed optimizing system would simply discard the eliminated solutions from its memory as solutions are eliminated. Thus, Matrix 6 in FIG. 23C illustrates an example of the data structure that would be stored in computer memory upon completing the disclosed process.

It should be appreciated that in the examples of FIGS. 17A to 23C, even though the settlement prices of Contract1, Contract2 and Contract3 could have been selected to be any one of various different values (based on their respective outright bids and offers) that would have been valid for those contracts, the optimization system determines that selecting Contract1's settlement price to be C1Tick1, selecting Contract2's settlement price to be C2Offer, and selecting Contract3's settlement price to be C3Offer is valid for the maximum number of outright contracts and spreads, increasing settlement accuracy and providing better pricing of position risk. Moreover, the optimization module is configured to determine which possible solutions, even though they are valid for certain outright instruments, can be safely discarded because they are not valid for other outright instruments, thus reducing calculation time and increasing efficiency without eliminating useful solutions.

It should also be appreciated that the possible solutions and sizes of the matrices in FIGS. 17A to 23C would change if the number of ticks between bids and offers changed, or if the number of contracts considered changed. Without the optimized discarding of the presently disclosed system, the number of permutations and data combinations to consider can become so high that optimizing over illiquid markets can become burdensome. The disclosed optimizing system improves settlement accuracy, pricing of risk and computer processing time by only determining and keeping only those solutions that respect price discovery through bid and offer indications.

For example, a contract, e.g., June 2015 Eurodollar contract, market may have a 9969 bid and a 9969.50 offer. Moreover, the market may have a 0.5 tradable tick, which is the price increment in which prices are quoted. Thus, there are two possibilities for the settlement of this contract, namely, 9969 or 9969.50. The exchange may select either value as a settlement price for the June 2015 Eurodollar contract, because both are valid for the June 2015 Eurodollar contract market. If the market had a 9969 bid and a 9970 offer with a 0.5 tick, then there would have been three possible settlement prices, namely, 9969, 9969.50 or 9970.

Additionally, the September 2015 Eurodollar contract market may have a 9956.50 bid and a 9957 offer, also with a 0.5 tick. Thus, there are two possibilities for the settlement of this contract, namely, 9956.50 and 9957. The exchange may select either value as a settlement price for the September 2015 Eurodollar contract, because both are valid for the September 2015 Eurodollar contract market. The markets for the June and September outright contracts are illustrated in FIG. 24.

When both the June and September Eurodollar contract markets are considered together, there are four possible solutions for the settlement prices of the June and September contracts, namely, [9969, 9956.50], [9969, 9957], [9969.50, 9956.50], and [9969.50, 9957], as shown in the first two columns of the table in FIG. 25. Each of these four solutions is associated with an implied spread. The third column of the table in FIG. 25 illustrates the implied spread between June and September for each possible solution of the June and September contracts.

Additionally, the market in the tradable spread instrument between the June and September contracts may have a 12 bid and 12.50 offer, also with a 0.5 tick. The market for the June-September spread contracts are illustrated in FIG. 26A.

Before selecting one of the four different possible combinations of settlement prices for the June and September contracts, the disclosed systems and method evaluate each of the potential contract solutions against the June 2015 to September 2015 Eurodollar spread market of 12 bid and 12.5 offer. In particular, the fourth column of the table in FIG. 26A contains data regarding whether the implied spread value between June and September for each possible solution is valid for the tradable June-September spread market. Although Solution 3, namely, 9969.50, 9956.50, is valid for the June and September contracts, the associated implied spread value of 13 of Solution 3 is not valid for the June 2015 to September 2015 Eurodollar spread market. The optimization module accordingly eliminates Solution 3 as possible settlement prices, as shown in FIG. 26B. The optimization module accordingly only considers Solutions 1, 2 and 4 when determining settlement prices for June and September.

The optimization module may also consider the possible solutions against additional contracts. It should be appreciated that the more contracts that are considered before selecting settlement prices, the more liquidity is maintained or created on the exchange. For example, the December 2015 Eurodollar contract market may have a 9939 bid and a 9939.50 offer, with a 0.5 tick. Thus, there are two possibilities for the settlement of this contract, namely, 9939 and 9939.50. The exchange may select either value as a settlement price for the December 2015 Eurodollar contract, because both are valid for the December 2015 Eurodollar contract market.

When the December 2015 contract is considered in addition to the June and September 2015 contracts, the number of possible solutions that are valid for these three contracts increases. Thus, the amount of data stored in memory and operated upon by the optimizing system and the price settlement system increases. In particular, the number of possible solutions increases from 3 possible solutions, namely, solutions 1, 2 and 4, to 3×2=6 possible solutions. Each one of solutions 1, 2 and 4 leads to two different solutions when considered in conjunction with the 2 possible solutions for the December 2015 contract, as shown in the second table in FIG. 27. At this stage, the possible solutions that are valid for the June, September and December contract markets are solutions 1, 2, and 4 to 7.

The optimization module then calculates the implied June-December spread for each possible solution, as shown in the third column of the table in FIG. 27. Because solution 3 was previously eliminated in the step associated with FIG. 26B, the solution combination and the implied June-December spread does not need to be calculated, thus saving time and computational resources.

As shown in FIG. 28, the market in the tradable spread instrument between the June and December contracts may have a 29.5 bid and 30 offer. As also shown in FIG. 28, the possible solutions for the contract settlement prices are filtered based upon whether the implied June-December spread value for each solution is valid for the June-December tradable spread instrument. In particular, possible solution 4, with an implied June-December spread of 30.5, is not valid for the June-December tradable spread instrument having a 29.5 bid and 30 offer. Solution 4 is therefore eliminated from the possible solutions.

As shown in FIG. 29, the market in the tradable spread instrument between the September and December contracts may have a 17.5 bid and 18 offer. As also shown in FIG. 29, the possible solutions for the contract settlement prices are filtered based upon whether the implied September-December spread value for each solution is valid for the September-December tradable spread instrument. In particular, all of the possible solutions are valid for the September-December tradable spread instrument. Thus, the filter used in the step associated with FIG. 29 does not result in the elimination of any of the possible solutions.

The optimization module next considers the June, September and December butterfly spread instrument, which may have a −5.5 bid and −5 offer, as shown in FIG. 30. As also shown in FIG. 30, the possible solutions for the contract settlement prices are filtered based upon whether the implied June-September-December spread value for each solution is valid for the June-September-December tradable butterfly spread market. In particular, possible solutions 2 and 5, with implied spreads of −6 and −4.5, respectively, are not valid for the June-September-December tradable spread instrument having a −5.5 bid and −5 offer. Solutions 2 and 5 are therefore eliminated from the possible solutions. Thus, as shown in FIG. 31, only solutions 1, 6 and 7 are valid for all the applied filters or pass the applied tests. These solutions can be said to be optimal or better solutions than the eliminated solutions, because the surviving solutions are not only valid for the underlying contracts' outright markets, the solutions are also valid for the tradable calendar spread markets and the tradable butterfly spread markets associated with the underlying contracts.

In one embodiment, the optimization module may attempt to determine the optimal solution for three different contracts by first considering all the permutations of possible settlement prices between two of the contracts, e.g., the first and second contracts, and filtering those permutations by eliminating those solution pairs whose implied spread is not valid for the tradable spread for that same contract pair. The surviving solution pairs are then expanded by considering permutations of the surviving solution pairs with a third contract, resulting in possible settlement prices for three contracts, and filters those permutations by eliminating solutions for which the implied spread value between two of the contracts, e.g., the first and third contracts, is not valid for the tradable spread for those same two contracts.

Thus, it should be appreciated that the optimization module strategically considers contract combinations and eliminates those solutions in which the implied spread value between contract prices is not valid for the tradable spread instrument for those same contracts. In one embodiment, the optimization module begins by considering a pair of contracts because without at least two contracts, there can be no spread to use to filter the possible solution set. Each time a new contract is considered, the number of possible solutions increases. For example, when the optimization module considers a third contract, the number of combinations of possible solutions increases. However, consideration of the third contract also allows the optimization module to filter the combinations of possible solutions by elimination those solutions where an implied spread between contracts fails the tradable spread instrument between the contracts.

In other words, each time a new contract is considered by the optimization module, the number of possible solutions is expanded due to the increase in possible combinations based on the new contract, and that expanded solution step is then filtered by eliminating solutions where an implied spread between contracts including the new contract fails the corresponding tradable spread instrument between contracts including the new contract. Moreover, the optimization module may begin with two contracts, consider the possible solutions and filter those solutions based on the implied spread/tradable spread test described above, then consider an additional contract, which involves expanding the number of possible solutions and filtering based on the implied spread/tradable spread test described above, then consider another additional contract, which involves expanding the number of possible solutions and filtering based on the implied spread/tradable spread test described above, and so on, e.g., in an iterative fashion, until the optimization module considers a predetermined number of contracts.

In one embodiment, the optimization module begins with two contracts, determines the set of possible solutions, filters the solutions by eliminating solutions whose implied spread value is not valid for the corresponding tradable spread resulting in a new solution set, considers a new contract, expands the current solution set by including the new possible combinations due to the new contract, filters the expanded solution set by eliminating solutions where an implied spread between contracts including the new contract fails the corresponding tradable spread instrument between contracts including the new contract resulting in a new solution set, and continues this process for new contracts. The process may end when there are no more new contracts to consider. The process may also end when eliminating solutions based on the implied spread/tradable spread iterative test described above results in no possible solutions. In this case, the optimization module selects a possible solution from a previous solution set having at least one possible solution.

If a possible solution set results in more than solution but the next filter results in no possible solutions, or if there are multiple possible solutions after all new contracts have been considered, the optimization module selects one of the possible solutions by comparing how close the solutions are to each contract's volume weighted average price. For example, the optimization module's process may result in two possible solutions, solution 1 having contract prices Contract1Price1, Contract2Price1 and Contract3Price1, and solution 2 having contract prices Contract1Price2, Contract2Price2 and Contract3Price2. The optimization module needs to select one of these two possible solutions for pricing three contracts, Contract1, Contract2 and Contract3. For each solution, the optimization module compares each contract price to the respective contract's volume weighted average price and for each solution, sums up the absolute values of the difference between each contract price to the respective contract's volume weighted average price, and picks the solution with the smallest sum. For example, as shown in FIG. 18, the optimization module may have arrived at two possible solutions for Contract1, Contract2 and Contract3 after performing the optimizing process. The optimization module may then compare each contract solution price to the contract's volume weighted average price over a predetermined window, e.g., the previous 60 seconds. The optimization module then sums the absolute value of the differences to arrive at an overall deviation for each solution. As shown in FIG. 32, the solution 1 Contract 1, 2 and 3 prices deviate from the VWAP prices by 1, 4 and 3 respectively, for a sum of 8. The solution 2 Contract 1, 2 and 3 prices deviate from the VWAP prices by 4, 1 and 1 respectively, for a sum of 6. Because the solution 2 contract prices deviate less than the solution 1 contract prices, the optimization module selects solution 2 contract prices as the settlement prices for the three contracts.

In one embodiment, the nearest month contract, e.g., Contract 1, price difference from VWAP is weighted more than the other months. For example, as shown in FIG. 32, the optimization module may determine an overall weighted deviation from the VWAP prices. The optimization module multiplies the Contract 1 price difference from VWAP by 3, the Contract 2 price difference from VWAP by 2, and Contract 3 price difference from VWAP by 1. As shown in FIG. 32, when the differences are weighted in this manner, the solution 1 Contract 1, 2 and 3 prices' weighted deviation from the VWAP prices sum is 14, and the solution 2 Contract 1, 2 and 3 prices' weighted deviation from the VWAP prices sum is 15. Because the solution 1 contract prices' weighted deviation is less than the solution 2 contract prices' weighted deviation, the optimization module selects solution 1 contract prices as the settlement prices for the three contracts.

The weighting factors used for the different contracts may be modified or adjusted. For example, the system may assign a different weighting factor to the different months.

It should be appreciated that while the example figures depict an array or matrix holding the relevant data, the data may be stored in the computer's memory in any convenient form or structure, such as a linked list, or through the use of pointers. As long as the computer can store the possible combinations of contract values and the associated differences between two values and their relationships, the actual location of the stored values and the format of the data and relationships are implementation specific.

Although some of the examples discussed herein relate to futures contracts and associated spread instruments, the disclosed embodiments for the optimization module may be applicable to options contracts, and in particular, to strike prices options contracts. For example, each options contract may include multiple strike prices, and an exchange system may receive multiple values for each strike price for an outright options contract. Moreover, even after the settlement module processes the received values, the exchange may have the choice of selecting one of multiple values for the strike prices for the options contracts. Thus, the optimization module may convert or translate each strike price for each options contract into a base object. The system may also convert spread instruments between strike prices into composite objects.

Figure 33:
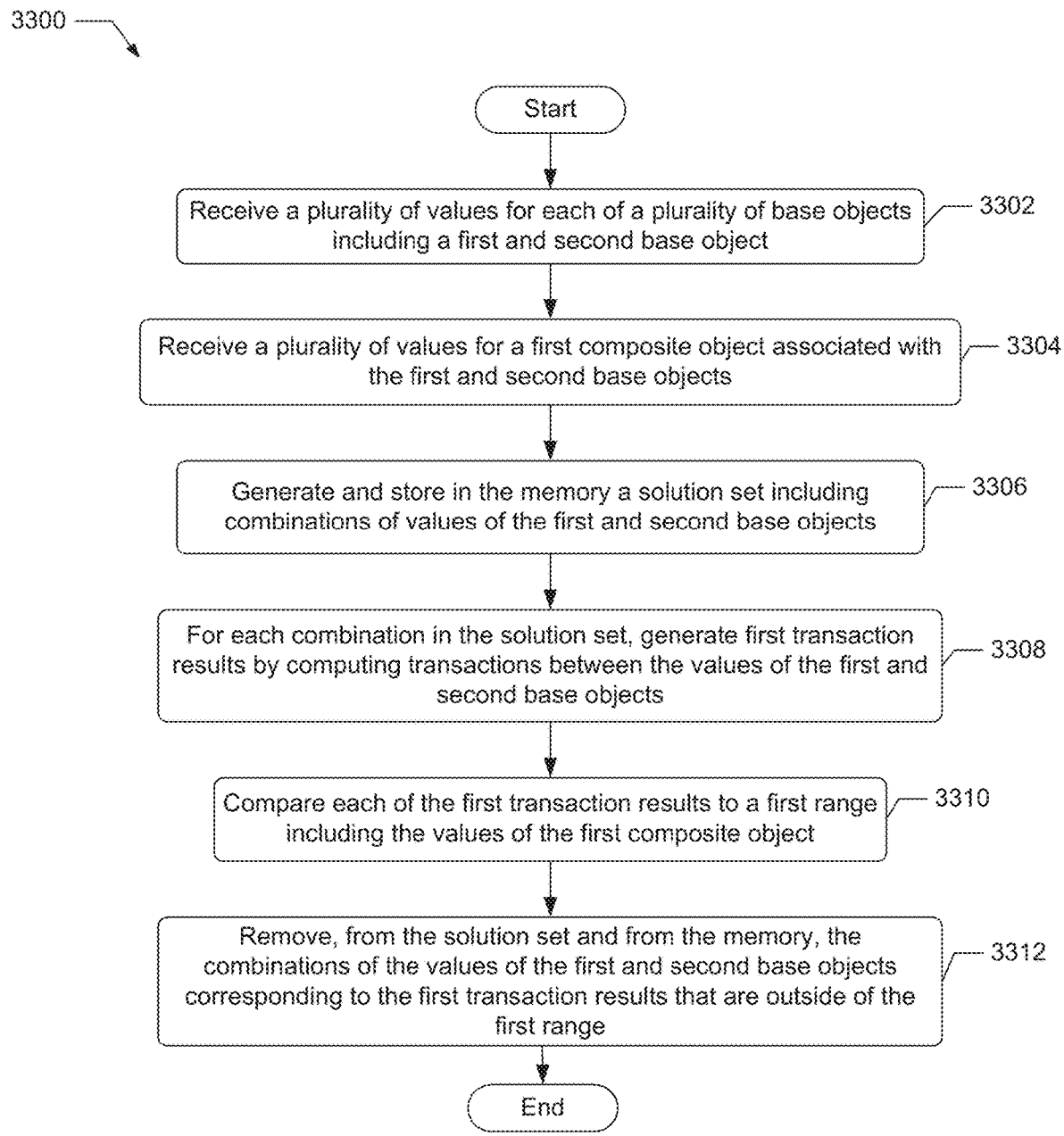
FIG. 33 depicts an example flowchart for implementing an optimization system in accordance with to the disclosed embodiments.

FIG. 33 illustrates an example flowchart 3300 indicating a method of implementing the disclosed optimization system, as may be implemented with computer devices and computer networks, such as those described with respect to FIGS. 1 and 2. Embodiments may involve all, more or fewer actions indicated by the blocks of FIG. 33. The actions may be performed in the order or sequence shown or in a different sequence.

In one embodiment, the steps of FIG. 33 may be carried out by optimization module 142. In one embodiment, the steps of FIG. 33 may be performed after the settlement module has determined that multiple prices could be valid for the outright markets for multiple, e.g., three, contracts.

The optimization module may first receive a plurality of values for each of a plurality of base objects including a first and second base object, as shown in block 3302. The optimization module may also receive a plurality of values for a first composite object associated with the first and second base objects, as shown in block 3304. Thus, the optimization module receives values for base and composite objects.

The optimization module may then generate and store in the memory a solution set including combinations of values of the first and second base objects, as shown in block 3306. The optimization module may then, for each combination of values in the solution set, generate first transaction results by computing transactions between the values of the first and second base objects, as shown in block 3308.

The optimization module may then compare each of the first transaction results to a first range of values including the values of the first composite object, as shown in block 3310. The optimization module may then remove, from the solution set and from the memory, the combinations of the values of the first and second base objects corresponding to the first transaction results that are outside of the first range of values, as shown in block 3312.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

The invention claimed is:

1. A computer implemented method comprising:
   repeatedly, by a processor, identifying values for first and second outright contracts and one or more related spread instruments, generating and storing in a memory data indicative of a solution set comprising possible combinations of values for the first and second outright contracts, the data being characterized by an initial amount, comparing each combination of values in the solution set stored in the memory to a value of a related spread instrument of the one or more related spread instruments, and reducing the amount of data by removing one or more combinations of values from the solution set stored in the memory as a function of the comparison, wherein upon each repetition, the method further comprises applying, iteratively, values for each of a set of other outright contracts to the solution;
   identifying, by the processor subsequent to the last reducing, one combination of values remaining in the solution set stored in the memory and further reducing the amount of data by removing all other values from the solution set stored in the memory; and
   calculating, by the processor, a settlement value for the plurality of outright contracts using the one combination of values which remains stored in the memory.

2. The computer implemented method of claim 1, wherein identifying the one combination of values comprises:
   determining, by the processor, that the solution set includes zero combinations of values of outright contracts, reverting the solution set to a previous version of the solution set including at least one combination of values of outright contracts;
   determining, by the processor, that previous version of the solution set includes one combination of values of outright contracts; and
   identifying, by the processor, the one combination of values.

3. The computer implemented method of claim 1, wherein identifying one combination of values comprises:
   determining, by the processor, that the solution set includes zero combinations of values of outright contracts, reverting the solution set to a previous version of the solution set including at least one combination of values of outright contracts;
   determining, by the processor, that the previous version of the solution set includes at least two combinations of values of outright contracts;
   applying, by the processor, a tiebreaker until the previous version of the solution set includes one combination of values of outright contracts; and
   identifying, by the processor, the one combination of values.

4. The computer implemented method of claim 1, wherein identifying one combination of values comprises:
   determining, by the processor, that the solution set includes at least two combinations of values of outright contracts;
   applying, by the processor, a tiebreaker until the solution set includes one combination of values of outright contracts; and
   identifying, by the processor, the one combination of values.

5. A computer implemented method comprising:
   generating, by a processor, data indicative of a solutions matrix comprising combinations of values of two selected outright contracts, and storing, by the processor, the generated data in a memory coupled therewith, the data being characterized by an initial amount;
   reducing, by the processor, the amount of data of the solutions matrix by removing one or more combinations of values from the solutions matrix stored in the memory based values for tradeable spread instruments related to the two selected outright contracts;
   updating, by the processor, the solutions matrix stored in the memory by adding combinations of another selected outright contract and reducing the amount of data of the solutions matrix by removing one or more combinations of values from the solutions matrix stored in the memory as a function of values for tradeable spread instruments related to the selected outright contracts until all outright contracts of a set of outright contracts have been added;
   determining, by the processor, that the solutions matrix stored in the memory comprises one combination of values of outright contracts remaining stored therein and based thereon removing values other than the values in the one combination of values from the solutions matrix stored in the memory to minimize the amount of data of the solutions matrix stored in the memory; and
   calculating, by the processor, a settlement value for the plurality of outright contracts using the one combination of values which remains stored in the solutions matrix stored in the memory.

6. The computer implemented method of claim 5, wherein identifying the one combination of values comprises:
   determining, by the processor, that the solutions matrix includes zero combinations of values of outright contracts, reverting the solutions matrix to a previous version of the solutions matrix including at least one combination of values of outright contracts;
   determining, by the processor, that previous version of the solutions matrix includes one combination of values of outright contracts; and
   identifying, by the processor, the one combination of values.

7. The computer implemented method of claim 5, wherein identifying one combination of values comprises:
   determining, by the processor, that the solutions matrix includes zero combinations of values of outright contracts, reverting the solutions matrix to a previous version of the solutions matrix including at least one combination of values of outright contracts;
   determining, by the processor, that the previous version of the solutions matrix includes at least two combinations of values of outright contracts;

applying, by the processor, a tiebreaker until the previous version of the solutions matrix includes one combination of values of outright contracts; and identifying, by the processor, the one combination of values.

8. The computer implemented method of claim 7, wherein the memory includes a pre-programmed value for each outright contract, and wherein the tiebreaker comprises:

for each combination of values of outright contracts:
for each outright contract in the respective combination of values of outright contracts, calculating, by the processor, an absolute difference between each value and the corresponding pre-programmed value;
multiplying, by the processor, each absolute difference by a weighting factor to generate a weighted difference; and
summing, by the processor, all of the weighted differences to calculate a total weighted difference from pre-programmed values;
comparing, by the processor, the total weighted differences from pre-programmed values for the at least two combinations of values; and
removing, by the processor, from the memory, all the values of each outright contract other than the values in the combination of values of outright contracts having the lowest total weighted difference from pre-programmed values.

9. The computer implemented method of claim 8, wherein each outright contract value is multiplied by a different weighting factor.

10. The computer implemented method of claim 8, wherein the pre-programmed value is a volume weighted average value.

11. The computer implemented method of claim 8, further comprising:
assigning, by the processor, the values in the combination of values of outright contracts having the lowest total weighted difference from pre-programmed values remaining in the memory as the final values of the respective outright contracts.

12. The computer implemented method of claim 5, wherein identifying one combination of values comprises:
determining, by the processor, that the solutions matrix includes at least two combinations of values of outright contracts;
applying, by the processor, a tiebreaker until the solutions matrix includes one combination of values of outright contracts; and
identifying, by the processor, the one combination of values.

13. The computer implemented method of claim 5, wherein filtering comprises:
comparing each combination of values in the solutions matrix to a range of values of a tradeable spread instrument related to the combination; and
removing combinations of values that are outside the range of values.

14. The computer implemented method of claim 5, wherein filtering comprises eliminating from the solutions matrix possible combinations with implied spreads that are not valid for a tradable spread for the combination.

15. The computer implemented method of claim 5, wherein the outright contracts each have a delivery date, and wherein the contracts differ only in delivery date.

16. A system comprising:
a processor coupled with a memory, the memory storing computer executable instructions that, when executed by the processor, cause the processor to:
identify, repeatedly, values for first and second outright contracts and one or more related spread instruments, generate and store in a memory data indicative of a solution set comprising possible combinations of values for the first and second outright contracts, the data being characterized by an initial amount, compare each combination of values in the solution set stored in the memory to a value of a related spread instrument of the one or more related spread instruments, and reduce the amount of data via removal of one or more combinations of values from the solution set stored in the memory as a function of the comparison, wherein upon each repetition, values for each of a set of other outright contracts to the solution are iteratively applied to the solution;
identify, subsequent to the last reducing, one combination of values remaining in the solution set stored in the memory to further reduce the amount of data via removal of all other values from the solution set stored in the memory; and
calculate a settlement value for the plurality of outright contracts using the one combination of values which remains stored in the memory.

17. The system of claim 16, wherein the computer executable instructions are further executable by the processor to cause the processor to:
determine that the solution set includes zero combinations of values of outright contracts, reverting the solution set to a previous version of the solution set including at least one combination of values of outright contracts;
determine that previous version of the solution set includes one combination of values of outright contracts; and
identify the one combination of values.

18. The system of claim 16, wherein the computer executable instructions are further executable by the processor to cause the processor to:
determine that the solution set includes zero combinations of values of outright contracts, reverting the solution set to a previous version of the solution set including at least one combination of values of outright contracts;
determine that the previous version of the solution set includes at least two combinations of values of outright contracts;
apply a tiebreaker until the previous version of the solution set includes one combination of values of outright contracts; and
identify the one combination of values.

19. The system of claim 16, wherein the computer executable instructions are further executable by the processor to cause the processor to:
determine that the solution set includes at least two combinations of values of outright contracts;
apply a tiebreaker until the solution set includes one combination of values of outright contracts; and
identify the one combination of values.

20. The system of claim 16, wherein the outright contracts each have a delivery date, and wherein the contracts differ only in delivery date.

* * * * *